United States Patent
Suzuki et al.

(10) Patent No.: US 9,854,599 B2
(45) Date of Patent: Dec. 26, 2017

(54) TERMINAL DEVICE, INTEGRATED CIRCUIT, AND RADIO COMMUNICATION METHOD CAPABLE OF REDUCING POWER CONSUMPTION IN RADIO COMMUNICATION SYSTEM TO WHICH DYNAMIC TDD IS APPLIED

(71) Applicant: Sharp Kabushiki Kaisha, Osaka-shi, Osaka (JP)

(72) Inventors: Shoichi Suzuki, Osaka (JP); Tatsushi Aiba, Osaka (JP); Yasuyuki Kato, Osaka (JP); Daiichiro Nakashima, Osaka (JP); Katsunari Uemura, Osaka (JP); Kazunari Yokomakura, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 151 days.

(21) Appl. No.: 14/787,191

(22) PCT Filed: Mar. 31, 2014

(86) PCT No.: PCT/JP2014/059422
§ 371 (c)(1),
(2) Date: Oct. 26, 2015

(87) PCT Pub. No.: WO2014/175003
PCT Pub. Date: Oct. 30, 2014

(65) Prior Publication Data
US 2016/0081110 A1    Mar. 17, 2016

(30) Foreign Application Priority Data

Apr. 26, 2013  (JP) .................................. 2013-093131

(51) Int. Cl.
*H04W 72/12* (2009.01)
*H04W 76/04* (2009.01)
(Continued)

(52) U.S. Cl.
CPC ....... *H04W 72/1263* (2013.01); *H04L 1/1861* (2013.01); *H04L 5/00* (2013.01);
(Continued)

(58) Field of Classification Search
None
See application file for complete search history.

(56) References Cited

U.S. PATENT DOCUMENTS

| 2014/0086112 A1* | 3/2014 | Stern-Berkowitz | H04W 72/1289 370/280 |
| 2014/0161001 A1* | 6/2014 | Gao | H04W 72/0446 370/280 |

OTHER PUBLICATIONS

Suzuki, S. et al.; "Terminal Device, Base Station Device, Integrated Circuit, and Radio Communication Method"; U.S. Appl. No. 14/438,314, filed Apr. 24, 2015.
(Continued)

*Primary Examiner* — Robert C Scheibel
(74) *Attorney, Agent, or Firm* — Keating & Bennett, LLP

(57) ABSTRACT

A terminal device sets a first UL-DL configuration, sets a subframe for monitoring a physical downlink control channel accompanied with information indicating a second UL-DL configuration, monitors the physical control channel accompanied with information indicating the second UL-DL configuration in the set subframe during an active time based on a first subframe set as a downlink subframe or a subframe including a DwPTS based on the first UL-DL configuration, and monitors a physical downlink control channel accompanied with a C-RNTI in a second subframe set as a downlink subframe or a subframe including the DwPTS based on the second UL-DL configuration during the active time.

6 Claims, 22 Drawing Sheets

(51) Int. Cl.
  *H04W 52/02* (2009.01)
  *H04L 1/18* (2006.01)
  *H04L 5/00* (2006.01)

(52) U.S. Cl.
  CPC ... *H04W 52/0229* (2013.01); *H04W 72/1289* (2013.01); *H04W 76/048* (2013.01); *Y02B 60/50* (2013.01)

(56) References Cited

OTHER PUBLICATIONS

Official Communication issued in International Patent Application No. PCT/JP2014/059422, dated Jun. 3, 2014.
Ericson et al., "On Efficient Signaling of Dynamic TDD", 3GPP TSG-RAN WG1 #72bis, R1-131458, Apr. 15-19, 2013, 3 pages.
Intel Corporation, "DRX Operation for Different UL/DL Configuration in TDD", 3GPP TSG-RAN2 Meeting #77bis, R2-121726, Mar. 26-30, 2012, 3 pages.
Panasonic, "Signaling Mechanisms for TDD UL-DL Reconfiguration", 3GPP TSG RAN WG1 Meeting #72bis, R1-131326, Apr. 15-19, 2013, pp. 1-3.
Ericson et al., "Signaling Support for Dynamic TDD", 3GPP TSG-RAN WG1 #72, R1-1310558 Jan. 28-Feb. 1, 2013, 3 pages.
Ericson et al., "On Standardization Impact of TDD UL-DL Adaptation", 3GPP TSG-RAN WG1 #69, R1-122016 May 21-25, 2012, pp. 1-3.

* cited by examiner

FIG. 9

| UPLINK-DOWNLINK CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | − (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | − (1) |
| 1 | 2 | 1, 2 |
| 1 | 4 | 1, 4 |
| 1 | 5 | 1, 2, 4, 5 |
| 2 | 2 | − (2) |
| 2 | 5 | 2, 5 |
| 3 | 3 | − (3) |
| 3 | 4 | 3, 4 |
| 3 | 5 | 3, 4, 5 |
| 4 | 4 | − (4) |
| 4 | 5 | 4, 5 |
| 5 | 5 | − (5) |
| 6 | 6 | − (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

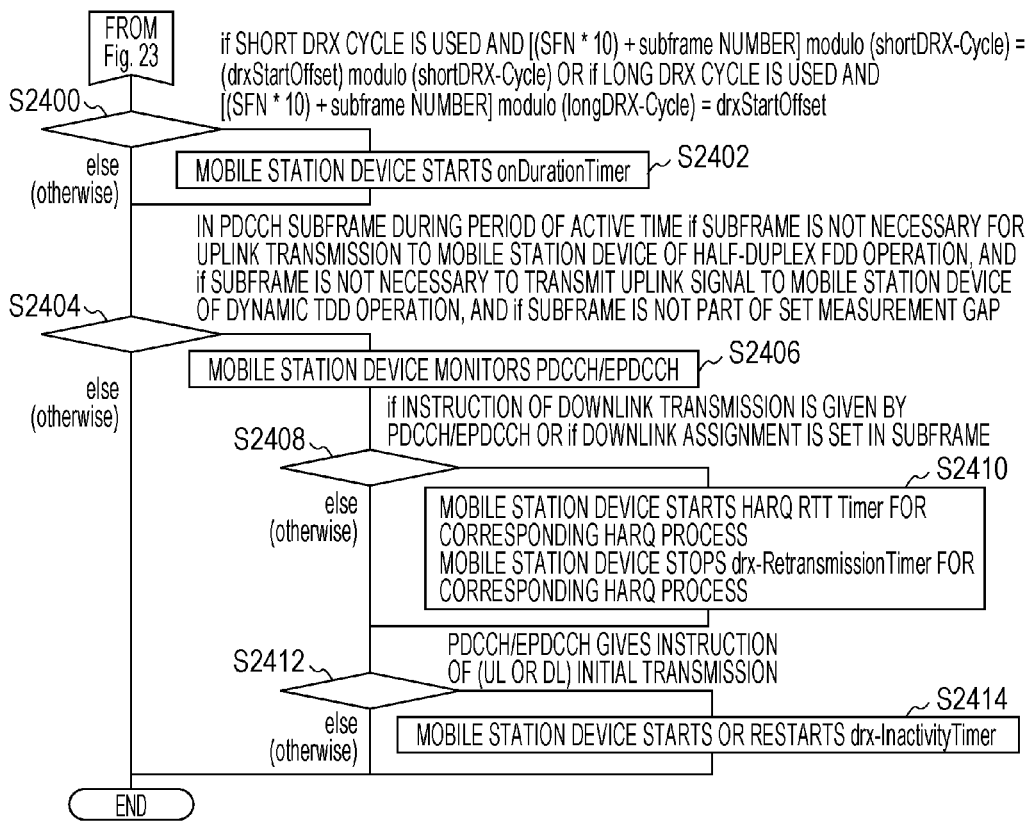

FIG. 29

| SFN | 0 | | | | | | | | | | 1 | | | | | | | | | | 2 | | | | | | | | | | 3 |
|---|---|---|---|---|---|---|---|---|---|---|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | ... |
| FIRST UPLINK REFERENCE UL-DL CONFIGURATION 0 | D | S | U | U | U | D | S | U | U | U | D | S | U | U | U | D | S | U | U | U | D | S | U | U | U | D | S | U | U | U | D | |
| FIRST DOWNLINK REFERENCE UL-DL CONFIGURATION 2 | D | S | U | D | D | D | S | U | D | D | D | S | U | D | D | D | S | U | D | D | D | S | U | D | D | D | S | U | D | D | D | |
| PDCCH SUBFRAME | P | P | | | P | P | P | P | | | P | P | | P | P | P | P | | | P | P | P | P | | P | P | P | P | | | P | |
| UPLINK HARQ PROCESS NUMBER | | 0 | 1 | | 2 | 3 | | 4 | 5 | | | 6 | 0 | | 1 | | 2 | | 3 | 4 | | 5 | 6 | | 0 | | 1 | | 2 | 3 | | |
| UL grant | | | | | | G | | | | | | | | | | | G | | | | | | | | | | | | | | | |
| PUSCH | | | | | | | | | | | | N | | | | | | | | | | | N | | | | | | | | | |
| DOWNLINK HARQ PROCESS NUMBER | 0 | 1 | | 2 | 3 | 4 | | | | 5 | 0 | | 1 | | 2 | 3 | 4 | | | 5 | 6 | | | R | | | | | | | | |
| PDSCH | N | N | | N | N | N | | | | | | R | R | | | | | | | | | R | | | | | | | | | | |
| ACTIVE TIME | A | A | A | A | A | A | A | A | A | A | A | A | A | A | A | A | A | | | | | | | | | | | | | | | |
| onDurationTimer | 6 | 5 | 4 | 3 | 2 | 1 | | | | | | | | | | | | | | | | | | | | | | | | | | |
| drx-InactivityTimer | 1 | 1 | 1 | 1 | 1 | 1 | 1 | 1 | | | | | | | | | | | | | | | | | | | | | | | | |
| drx-RetransmissionTimer#0 | | | | | | | | | | | 3 | | | | | | | | | | | | | | | | | | | | | |
| drx-RetransmissionTimer#1 | | | | | | | | | | | 3 | | | 2 | 1 | | | | | | | | | | | | | | | | | |
| HARQ RTT timer#0 | 10 | 9 | 8 | 7 | 6 | 5 | 4 | 3 | 2 | 1 | 0 | | | | | | | | | | | | | | | | | | | | | |
| HARQ RTT timer#1 | 10 | 9 | 8 | 7 | 6 | 5 | 4 | 3 | 2 | 1 | 0 | | | | | | | | | | | | | | | | | | | | | |
| UL Tx timer#6 | | | | | -6 | -5 | -4 | -3 | -2 | -1 | | | | | | | | | | | -7 | -6 | -5 | -4 | -3 | -2 | -1 | | | | | |

TERMINAL DEVICE, INTEGRATED CIRCUIT, AND RADIO COMMUNICATION METHOD CAPABLE OF REDUCING POWER CONSUMPTION IN RADIO COMMUNICATION SYSTEM TO WHICH DYNAMIC TDD IS APPLIED

TECHNICAL FIELD

The present invention relates to a terminal device, an integrated circuit, and a radio communication method.

BACKGROUND ART

Radio access schemes and radio networks (hereinafter referred to as "Long Term Evolution (LTE)" or "Evolved Universal Terrestrial Radio Access (EUTRA)") of cellular mobile communication have been examined in 3rd Generation Partnership Project (3GPP). In LTE, an Orthogonal Frequency Division Multiplexing (OFDM) scheme is used for downlink. In LTE, a Single-Carrier Frequency Division Multiple Access (SC-FDMA) scheme is used for uplink. In LTE, a base station device is referred to as an evolved NodeB (eNodeB) and a mobile station device is referred to as a User Equipment (UE). LTE is a cellular communication system in which a plurality of areas covered by base station devices are arranged in a cell form. A single base station device may manage a plurality of cells.

LTE corresponds to Time Division Duplex (TDD). LTE adopting a TDD scheme is referred to as TD-LTE or LTE TDD. TDD is a technology for enabling full duplex communication in a single frequency band by performing time division multiplexing on an uplink signal and a downlink signal.

In 3GPP, a traffic adaptation technology and an interference reduction technology (DL-UL Interference Management and Traffic Adaptation) for changing a ratio of an uplink resource to a downlink resource according to uplink traffic and downlink traffic have been examined.

NPL 1 proposes a method of using a flexible subframe as a method of realizing traffic adaptation. A base station device can transmit a downlink signal or can receive an uplink signal with a flexible subframe. In NPL 1, a mobile station device regards a flexible subframe as a downlink subframe unless the mobile station device is instructed to transmit an uplink signal by the base station device. Here, the traffic adaptation technology is also referred to as dynamic TDD.

NPL 1 describes that a Hybrid Automatic Repeat reQuest (HARQ) timing corresponding to a Physical Downlink Shared CHannel (PDSCH) is decided based on a newly introduced uplink-downlink configuration (UL-DL configuration) and an HARQ timing corresponding to a Physical Uplink Shared CHannel (PUSCH) is decided based on a first uplink-downlink configuration.

NPL 2 describes that (a) an UL/DL Reference Configuration is introduced and (b) several subframes can be scheduled for either uplink or downlink in accordance with dynamic grant/assignment from a scheduler.

In LTE release 10, a carrier aggregation technology for setting a plurality of cells for mobile station devices has been introduced.

CITATION LIST

Non-Patent Document

NPL 1: "On standardization impact of TDD UL-DL adaptation", R1-122016, Ericsson, ST-Ericsson, 3GPP TSG-RAN WG1 Meeting #69, Prague, Czech Republic, 21st to 25th May 2012

NPL 2: "Signaling support for dynamic TDD", R1-130558, Ericsson, ST-Ericsson, 3GPP TSG-RAN WG1 Meeting #72, St Julian's, Malta, 28th Jan. to 1st Feb. 2013

DISCLOSURE OF THE INVENTION

Problems to be Solved by the Invention

When a traffic adaptation technology is applied, throughput can be considerably improved further than when a ratio of an uplink resource to a downlink resource is not changed. However, in a radio communication system to which dynamic TDD is applied, technologies for reducing power consumption have not been sufficiently examined.

The present invention has been devised in light of the foregoing circumstances and an object of the present invention is to provide a terminal device, an integrated circuit, and a radio communication method capable of reducing power consumption in a radio communication system to which dynamic TDD is applied.

Means for Solving the Problems (1) In order to achieve an object described above, the present invention has devised the following means. That is, there is provided a terminal device performing a process for discontinuous reception, including: a configuration unit that sets a first UL-DL configuration and sets a subframe for monitoring a physical downlink control channel accompanied with information indicating a second UL-DL configuration; and a reception unit that monitors the physical downlink control channel accompanied with information indicating the second UL-DL configuration in the set subframe during an active time based on a first subframe set as a downlink subframe or a subframe including a DwPTS based on the first UL-DL configuration, and monitors a physical downlink control channel accompanied with a C-RNTI in a second subframe set as a downlink subframe or a subframe including the DwPTS based on the second UL-DL configuration during the active time.

(2) In the terminal device according to the present invention, the active time includes a period in which a timer is running, and the timer is related to the number of first subframes continuous from beginning of a cycle of the discontinuous reception.

(3) In the terminal device according to the present invention, the timer starts at the beginning of the cycle of the discontinuous reception and ends based on the number of first subframes continuous from the beginning of the cycle of the discontinuous reception.

(4) In the terminal device according to the present invention, the subframe set as an uplink subframe based on the first UL-DL configuration is able to be set as an uplink subframe or a downlink subframe based on the second UL-DL configuration.

(5) In the terminal device according to the present invention, further includes a transmission unit that transmits an HARQ-ACK, in which the configuration unit sets a third UL-DL configuration, and in which based on detection of the physical downlink control channel accompanied with the C-RNTI in subframe n, the reception unit decodes a physical downlink shared channel corresponding to the physical downlink control channel accompanied with the C-RNTI by using the subframe n, in which the transmission unit transmits the HARQ-ACK for the physical downlink shared channel decoded with the subframe n by using subframe n+k, and in which k is given based on the third UL-DL configuration.

(6) In the terminal device according to the present invention, based on detection of the physical downlink control channel accompanied with the C-RNTI in subframe m, the transmission unit transmits a physical uplink shared channel corresponding to the physical downlink control channel accompanied with the C-RNTI by using subframe m+j, and j is given based on the first UL-DL configuration.

(7) In the terminal device according to the present invention, the configuration unit sets a measurement gap, and the reception unit monitors the physical downlink control channel accompanied with the C-RNTI when the subframe is not present in part of the set measurement gap in regard to a subframe set as the downlink subframe or the subframe including the DwPTS based on the second UL-DL configuration.

(8) In the terminal device according to the present invention, the first UL-DL configuration and the second UL-DL configuration are defined by a downlink subframe, an uplink subframe, and a subframe including the DwPTS in a frame.

(9) In the terminal device according to the present invention, the third UL-DL configuration is defined by a downlink subframe, an uplink subframe, and a subframe including the DwPTS in a frame.

(10) According to the present invention, there is provided an integrated circuit mounted on a terminal device performing a process for discontinuous reception, the integrated circuit causing the terminal device to have a series of functions including: a function of setting a first UL-DL configuration; a function of setting a subframe for monitoring a physical downlink control channel accompanied with information indicating a second UL-DL configuration; a function of monitoring the physical control channel accompanied with the second UL-DL configuration in the set subframe during an active time based on a first subframe set as a downlink subframe or a subframe including a DwPTS based on the first UL-DL configuration; and a function of monitoring a physical downlink control channel accompanied with a C-RNTI in a second subframe set as a downlink subframe or a subframe including the DwPTS based on the second UL-DL configuration during the active time.

(11) According to the present invention, there is provided a radio communication method used for a terminal device performing a process for discontinuous reception, the radio communication method including: setting a first UL-DL configuration; setting a subframe for monitoring a physical downlink control channel accompanied with information indicating a second UL-DL configuration; monitoring the physical control channel accompanied with information indicating the second UL-DL configuration in the set subframe during an active time based on a first subframe set as a downlink subframe or a subframe including a DwPTS based on the first UL-DL configuration; and monitoring a physical downlink control channel accompanied with a C-RNTI in a second subframe set as a downlink subframe or a subframe including the DwPTS based on the second UL-DL configuration during the active time.

Effects of the Invention

According to the present invention, in a radio communication system to which dynamic TDD is applied, it is possible to reduce power consumption.

BRIEF DESCRIPTION OF THE DRAWINGS

FIG. 9 is a table illustrating an example of an uplink-downlink configuration according to the embodiment.

FIG. 12 is a diagram illustrating a pair formed by the first uplink reference UL-DL configuration in the other serving cell (primary cell) and the first uplink reference UL-DL configuration in a serving cell (secondary cell) and correspondence of a second uplink reference UL-DL configuration in the secondary cell according to the embodiment.

FIG. 14 is a diagram illustrating a pair formed by the first downlink reference UL-DL configuration in a primary cell and the first downlink reference UL-DL configuration in a secondary cell and correspondence of a second downlink reference UL-DL configuration in the secondary cell according to the embodiment.

FIG. 15 is a diagram illustrating a relation between a subframe instructed in accordance with the first uplink reference UL-DL configuration and a subframe instructed in accordance with the first downlink reference UL-DL configuration according to the embodiment.

FIG. 16 is a diagram illustrating a relation among a subframe instructed in accordance with the first uplink reference UL-DL configuration, a subframe instructed in accordance with the first downlink reference UL-DL configuration, and a subframe instructed in accordance with a transmission direction UL-DL configuration according to the embodiment.

FIG. 17 is a diagram illustrating a relation among the first uplink reference UL-DL configuration, the first downlink reference UL-DL configuration, and the transmission direction UL-DL configuration according to the embodiment.

FIG. 18 is a diagram illustrating correspondence between subframe n in which PDCCH/EPDCCH/PHICH is disposed and subframe n+k in which a PUSCH corresponding to PDCCH/EPDCCH/PHICH is disposed according to the embodiment.

FIG. 19 is a diagram illustrating correspondence between subframe n in which a PHICH is disposed and subframe n−k in which a PUSCH corresponding to the PHICH is disposed according to the embodiment.

FIG. 20 is a diagram illustrating correspondence between subframe n in which a PUSCH is disposed and subframe n+k in which a PHICH corresponding to the PUSCH is disposed according to the embodiment. A mobile station device 1 specifies (selects or decides) a value of k in accordance with the table of FIG. 20.

FIG. 21 is a diagram illustrating correspondence between subframe n−k in which a PDSCH is disposed and subframe n in which an HARQ-ACK corresponding to the PDSCH is transmitted according to the embodiment.

FIG. 24 is a flowchart illustrating an example of the DRX operation according to the embodiment.

FIG. 25 is a diagram illustrating examples of PDCCH subframes according to the embodiment.

FIG. 26 is a diagram illustrating examples of PDCCH subframes according to the embodiment.

FIG. 29 is a diagram illustrating an example of the DRX operation according to the embodiment.

MODE FOR CARRYING OUT THE INVENTION

Hereinafter, embodiments of the present invention will be described.

In an embodiment, a plurality of cells are set for a mobile station device. A technology in which a mobile station device performs communication via a plurality of cells is referred to as cell aggregation or carrier aggregation. The present invention may be applied to each of the plurality of cells set for the mobile station device. The present invention may also be applied to some of the plurality of set cells. A cell set in a mobile station device is referred to as a serving cell.

A plurality of set serving cells include one primary cell and one secondary cell or a plurality of secondary cells. The primary cell is a serving cell in which an initial connection establishment procedure is performed, a serving cell in which connection re-establishment procedure starts, or a cell instructed as a primary cell in a handover procedure. The secondary cell may be set when or after RRC connection is established.

A Time Division Duplex (TDD) scheme is applied to a radio communication system according to the embodiment. In the case of cell aggregation, the TDD scheme may be applied to some or all of the plurality of cells.

When the plurality of cells to which the TDD is applied are aggregated, a half-duplex TDD scheme or a full-duplex TDD scheme is applied.

A mobile station device of the half-duplex TDD scheme cannot simultaneously perform uplink transmission and downlink reception in a plurality of cells to which the TDD is applied. In the case of the half-duplex TDD, a mobile station device does not simultaneously perform transmission and reception in one primary cell of a certain band, or one primary cell and one secondary cell or a plurality of secondary cells of a plurality of different bands.

A mobile station device of the full-duplex TDD scheme can simultaneously perform uplink transmission and downlink reception in a plurality of cells to which the TDD is applied. In the case of the full-duplex TDD, a mobile station device can simultaneously perform transmission and reception in a plurality of serving cells of a plurality of different bands.

A mobile station device transmits information indicating a combination of bands in which carrier aggregation is supported by the mobile station device to a base station device. The mobile station device transmits information indicating whether simultaneous transmission and reception is supported in the plurality of serving cells in the plurality of different bands to the base station device in each combination of the bands.

When a cell to which the TDD is applied and a cell to which a Frequency Division Duplex (FDD) is applied are aggregated, the present invention can be applied to the cell to which the TDD is applied.

In the embodiment, "X/Y" includes a meaning of "X or Y". In the embodiment, "X/Y" includes a meaning of "X and Y". In the embodiment, "X/Y" includes a meaning of "X and/or Y".

Figure 1:
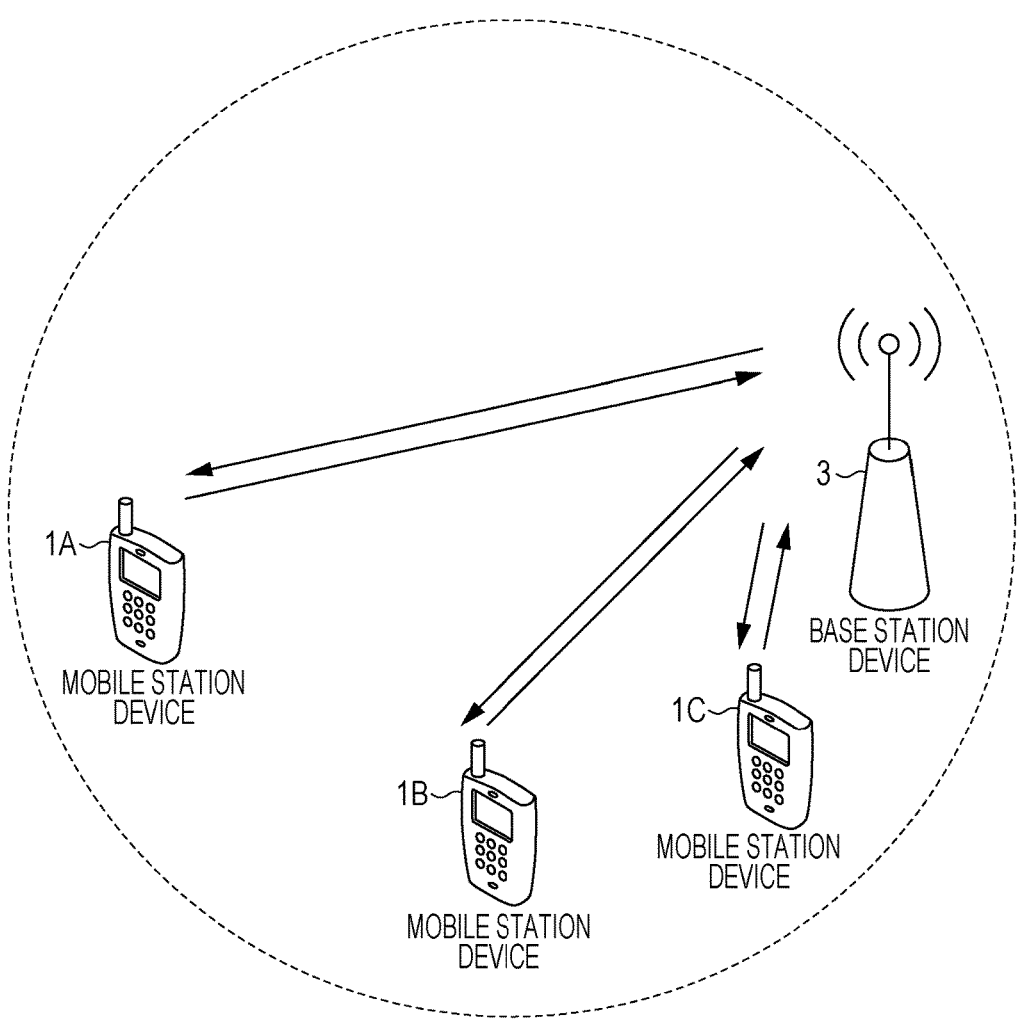
FIG. 1 is a conceptual diagram illustrating a radio communication system according to an embodiment.

FIG. 1 is a conceptual diagram illustrating a radio communication system according to the embodiment. In FIG. 1, the radio communication system includes mobile station devices 1A to 1C and a base station device 3. Hereinafter, the mobile station devices 1A to 1C are referred to as the mobile station devices 1.

Physical channels and physical signals according to the embodiment will be described.

In FIG. 1, the following uplink physical channels are used for uplink radio communication from the mobile station device 1 to the base station device 3. The uplink physical channels are used to transmit information output from a higher layer.

Physical Uplink Control CHannel (PUCCH)
Physical Uplink Shared CHannel (PUSCH)
Physical Random Access CHannel (PRACH)

The PUCCH is a physical channel used to transmit Uplink Control Information (UCI). The uplink control information includes Channel State Information (CSI) regarding downlink, a Scheduling Request (SR) indicating a request for PUSCH resources, and an ACKnowledgement (ACK)/Negative-ACKnowledgement (NACK) (ACK/NACK) for downlink data (a transport block or a Downlink-Shared CHannel (DL-SCH)). The ACK/NACK is also referred to as HARQ-ACK, an HARQ feedback, or response information.

The PUSCH is a physical channel that is used to transmit uplink data (an uplink-Shared CHannel (UL-SCH)). The PUSCH may be used to transmit the HARQ-ACK and/or the channel state information along with the uplink data. The PUSCH may be used to transmit only the channel state information or only the HARQ-ACK and the channel state information.

The PRACH is a physical channel that is used to transmit a random access preamble. The PRACH is mainly used for the mobile station device 1 to synchronize a time domain with the base station device 3. The PRACH is also used for an initial connection establishment procedure, a handover procedure, a connection re-establishment procedure, synchronization (timing adjustment) of uplink transmission, and a request for PUSCH resources.

In FIG. 1, the following uplink physical signal is used for uplink radio communication. The uplink physical signal is not used to transmit information output form a higher layer, but is used for a physical layer.

Uplink Reference Signal (UL RS)

In the embodiment, the following two types of uplink reference signals are used.

DeModulation Reference Signal (DMRS)

Sounding Reference Signal (SRS)

The DMRS is related to transmission of the PUSCH or the PUCCH. The DMRS is subjected to time multiplexing along with the PUSCH or the PUCCH. For example, the base station device 3 uses the DMRS to correct a propagation path of the PUSCH or the PUCCH. Hereinafter, transmission of both the PUSCH and the DMRS is simply referred to as transmission of the PUSCH. Hereinafter, transmission of both the PUCCH and the DMRS is simply referred to as transmission of the PUCCH.

The SRS is not related to transmission of the PUSCH or the PUCCH. For example, the base station device 3 uses the SRS to measure an uplink channel state. The mobile station device 1 transmits a first SRS with a first resource set by a higher layer. The mobile station device 1 transmits a second SRS with a second resource set by a higher layer only once when information indicating a request for transmitting the SRS is received via the PDCCH. The first SRS is also referred to as a periodic SRS or a type 0 triggered SRS. The second SRS is also referred to as an aperiodic SRS or a type 1 triggered SRS. Transmission of the aperiodic SRS is scheduled by the information indicating a request for transmitting the SRS.

In FIG. 1, the following downlink physical channels are used for downlink radio communication from the base station device 3 to the mobile station device 1. The downlink physical channels are used to transmit information output from a higher layer.

Physical Broadcast CHannel (PBCH)

Physical Control Format Indicator CHannel (PCFICH)

Physical Hybrid automatic repeat request Indicator CHannel (PHICH)

Physical Downlink Control CHannel (PDCCH)

Enhanced Physical Downlink Control CHannel (EPDCCH)

Physical Downlink Shared CHannel (PDSCH)

Physical Multicast CHannel (PMCH)

The PBCH is used to report a Master Information Block (MIB or a Broadcast CHannel (BCH)) used commonly with the mobile station device 1. The MIB is transmitted at intervals of 40 ms and the MIB is transmitted repeatedly at a periodicity of 10 ms. Specifically, the MIB is initially transmitted with subframe 0 of a radio frame in which "SFN mod 4=0" is satisfied, and the MIB is retransmitted (repeated) with subframe 0 of all the other radio frames. A System Frame Number (SFN) is a radio frame number. The MIB is system information. For example, the MIB includes information indicating the SFN.

The PCFICH is used to transmit information for giving an instruction for a region (for example, OFDM symbols) used to transmit the PDCCH.

The PHICH is used to transmit an HARQ indicator (an HARQ feedback or response information) indicating an ACK (ACKnowledgement) or a NACK (Negative ACKnowledgement) for uplink data (Uplink Shared CHannel (UL-SCH)) received by the base station device 3. For example, when the mobile station device 1 receives the HARQ indicator indicating the ACK, mobile station device 1 does not retransmit corresponding uplink data. For example, when the mobile station device 1 receives the HARQ indicator indicating the NACK, the mobile station device 1 retransmits corresponding uplink data. The single PHICH transmits the HARQ indicator for single uplink data.

The base station device 3 transmits each of the HARQ indicators for a plurality of pieces of uplink data included in the same PUSCH using a plurality of PHICHs.

The PDCCH and the EPDCCH are used to transmit Downlink Control Information (DCI). The downlink control information is also referred to as the DCI format. The downlink control information includes a downlink grant and an uplink grant. The downlink grant is also referred to as a downlink assignment or a downlink allocation.

The downlink grant is used to schedule a single PDSCH in a single cell. The downlink grant is used to schedule the PDSCH in the same subframe as a subframe with which the downlink grant is transmitted. The uplink grant is used to schedule a single PUSCH in a single cell. The uplink grant is used to schedule a single PUSCH in a subframe after 4 subframes from a subframe with which the uplink grant is transmitted.

A Cyclic Redundancy Check (CRC) parity bit is added to the DCI format. The CRC parity bit is scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers identifying a mobile station device in a cell.

The C-RNTI is used to control the PDSCH or the PUSCH in a single subframe. The SPS C-RNTI is used to periodically allocate resources of the PDSCH or the PUSCH.

The PDSCH is used to transmit downlink data (Downlink Shared CHannel (DL-SCH)).

The PMCH is used to transmit multicast data (Multicast CHannel (MCH)).

In FIG. 1, the following physical signals are used for downlink radio communication. The downlink physical signals are not used to transmit information output from a higher layer, but are used by a physical layer.

Synchronization Signal (SS)

Downlink Reference Signal (DL RS)

The synchronization signals are used for the mobile station device 1 to synchronize a frequency domain and a time domain of downlink. In the TDD scheme, synchronization signals are disposed in subframes 0, 1, 5, and 6 in a radio frame. In the FDD scheme, synchronization signals are disposed in subframes 0 and 5 in a radio frame.

The downlink reference signals are used for the mobile station device 1 to correct a propagation path of a downlink physical channel. The downlink reference signals are used for the mobile station device 1 to calculate downlink channel state information.

In the embodiment, the following 5 types of downlink reference signals are used.

Cell-specific Reference Signal (CRS)

UE-specific Reference Signal (URS) related to the PDSCH

DeModulation Reference Signal (DMRS) related to the EPDCCH

Non-Zero Power Channel State Information-Reference Signal (NZP CSI-RS)

Zero Power Channel State Information Reference Signal (ZP CSI-RS)

Multimedia Broadcast and Multicast Service over Single Frequency Network Reference Signal (MBSFN RS)

Positioning Reference Signal (PRS)

The CRS is transmitted with all of the subframes. The CRS is used to demodulate the PBCH/PDCCH/PHICH/PCFICH/PDSCH. The CRS may be used for the mobile station device 1 to calculate downlink channel state information. The PBCH/PDCCH/PHICH/PCFICH is transmitted with an antenna port used to transmit the CRS.

The URS related to the PDSCH is transmitted with a subframe and a band used to transmit the PDSCH to which the URS is related. The URS is used to demodulate the PDSCH to which the URS is related.

The PDSCH is transmitted with an antenna port used to transmit the CRS or the URS. DCI format 1A is used to schedule the PDSCH transmitted with the antenna port used to transmit the CRS. DCI format 2D is used to schedule the PDSCH transmitted with the antenna port used to transmit the URS.

The DMRS related to the EPDCCH is transported with a subframe and a band used to transmit the EPDCCH to which the DMRS is related. The DMRS is used to demodulate the EPDCCH to which the DMRS is related. The EPDCCH is transmitted with an antenna port used to transmit the DMRS.

The NZP CSI-RS is transmitted with a set subframe. Resources with which the NZP CSI-RS is transmitted are set by the base station device. The NZP CSI-RS is used for the mobile station device 1 to calculate downlink channel state information.

The resources of the ZP CSI-RS are set by the base station device. The base station device transmits the ZP CSI-RS by using a zero output. That is, the base station device does not transmit the ZP CSI-RS. The base station device does not transmit the PDSCH and the EPDCCH in the set resources of the ZP CSI-RS. For example, the mobile station device 1 can measure interference in resources to which the NZP CSI-RS corresponds in a certain cell.

The MBSFN RS is transmitted with all of the bands of the subframes used to transmit the PMCH. The MBSFN RS is used to demodulate the PMCH. The PMCH is transmitted with an antenna port used to transmit the MBSFN RS.

The PRS is used for the mobile station device to measure a geographic position of the own device.

Here, the downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the MCH, the UL-SCH, and the DL-SCH are transport channels. Channels used in a Medium Access Control (MAC) layer are referred to as transport channels. Units of the transport channels used in the MAC layer are referred to as Transport Blocks (TB) or MAC Protocol Data Units (PDUs). For example, control of a Hybrid Automatic Repeat reQuest (HARQ) is performed for each transport block in the MAC layer. The transport blocks are units of data delivered from the MAC layer to the physical layer. In the physical layer, the transport block is mapped to a codeword and a coding process is performed for each codeword.

Hereinafter, the structure of a radio frame according to the embodiment will be described.

Figure 2:
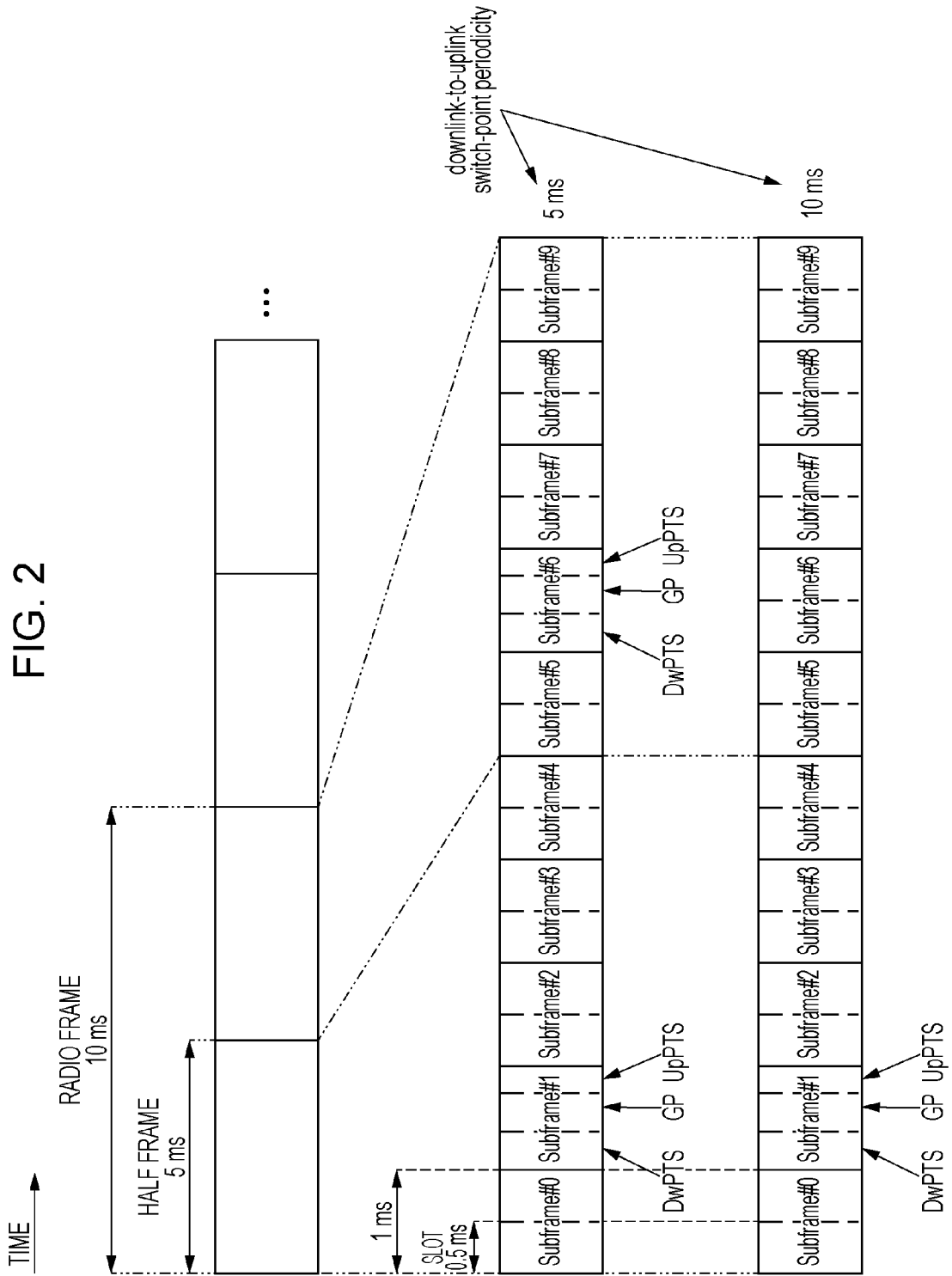
FIG. 2 is a diagram illustrating a schematic structure of a radio frame according to the embodiment.

FIG. 2 is a diagram illustrating a schematic structure of a radio frame according to the embodiment. For example, each radio frame has a length of 10 ms. In FIG. 2, the horizontal axis is a time axis. Each radio frame is configured to include two half frames. Each half frame has a length of 5 ms. Each half frame is configured to include 5 subframes. Each subframe has a length of 1 ms and is defined by 2 continuous slots. Each slot has a length of 0.5 ms. An i-th subframe in the radio frame is configured to include a (2×i)-th slot and a (2×i+1)-th slot. That is, 10 subframes are used at intervals of 10 ms.

In the embodiment, the following three types of subframes are defined.
 downlink subframe (first subframe)
 uplink subframe (second subframe)
 special subframe (third subframe)

The downlink subframe is a subframe that is reserved for downlink transmission. The uplink subframe is a subframe that is reserved for uplink transmission. The special subframe is configured to three fields. The three fields are a Downlink Pilot Time Slot (DwPTS), a Guard Period (GP), and an Uplink Pilot Time Slot (UpPTS). The total length of the DwPTS, the GP, and the UpPTS is 1 ms. The DwPTS is a field that is reserved for downlink transmission. The UpPTS is a field that is reserved for uplink transmission. The GP is a field that is not used for downlink transmission and uplink transmission. The special subframe may be configured to include only the DwPTS and the GP or may be configured to include only the GP and the UpPTS.

The single radio frame is configured to include at least the downlink subframe, the uplink subframe, and the special subframe.

In the radio communication system according to the embodiment, downlink-uplink switch-point periodicities of 5 ms and 10 ms are supported. When the downlink-uplink switch-point periodicity is 5 ms, the special subframe is included in both of the half frames in the radio frame. When the downlink-uplink switch-point periodicity is 10 ms, the special subframe is included only in the first half frame in the radio frame.

Hereinafter, the structure of a slot according to the embodiment will be described.

Figure 3:
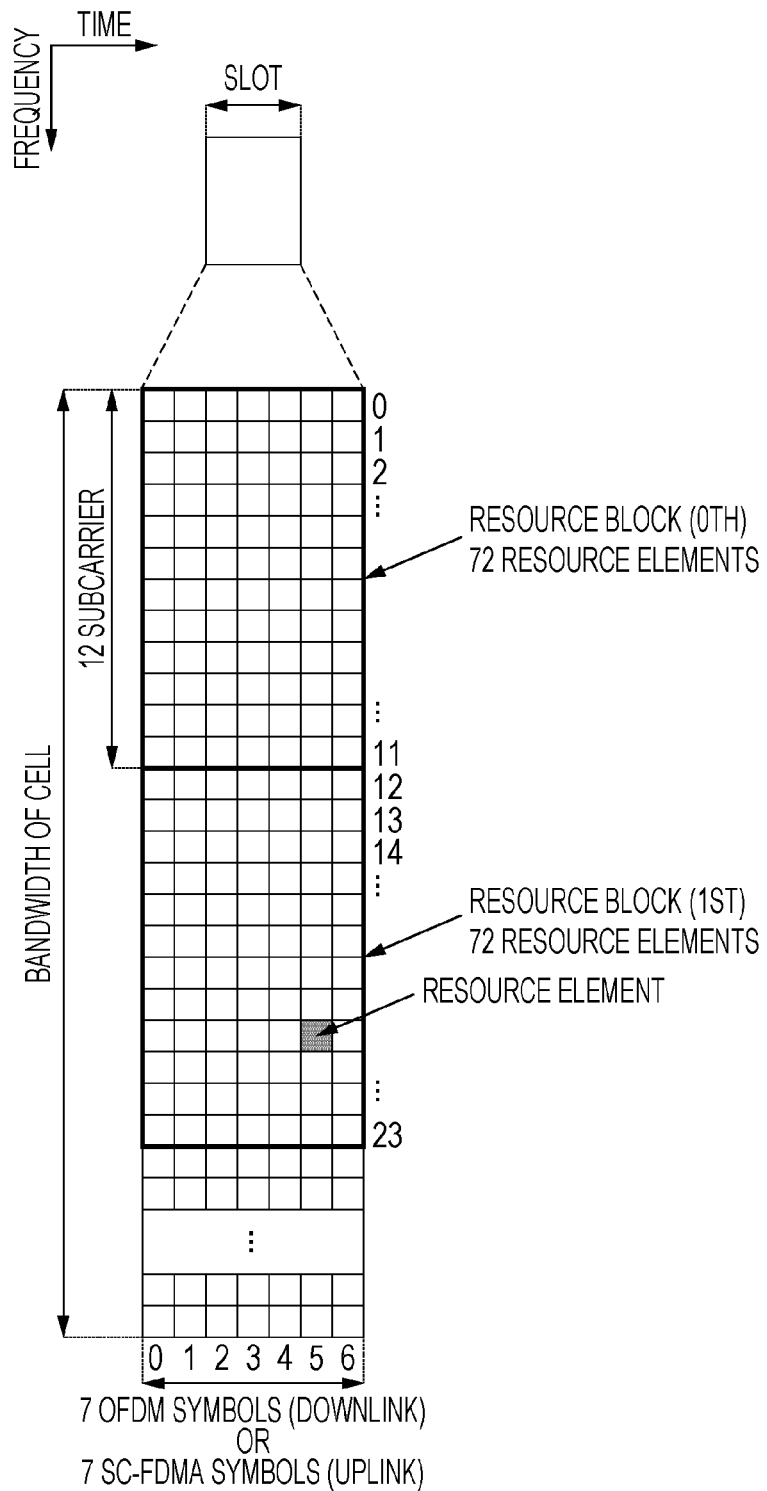
FIG. 3 is a diagram illustrating an example of the structure of a slot according to the embodiment.

FIG. 3 is a diagram illustrating the structure of the slot according to the embodiment. The physical signals or the physical channels transmitted with each slot are expressed by a resource grid. In FIG. 3, the horizontal axis is a time axis and the vertical axis is a frequency axis. In downlink, the resource grid is defined in accordance with a plurality of subcarriers and a plurality of OFDM symbols. In uplink, the resource grid is defined in accordance with a plurality of subcarriers and a plurality of SC-FDMA symbols. The number of subcarriers included in one slot depends on the bandwidth of a cell. The number of OFDM symbols or SC-FDMA symbols included in one slot is 7. Each of the elements in the resource grid is referred to as a resource element. The resource element is identified using a subcarrier number and an OFDM symbol or SC-FDMA symbol number.

The resource block is used to express mapping of a certain physical channel (the PDSCH, the PUSCH, or the like) to the resource element. In a resource block, a virtual resource block and a physical resource block are defined. A certain physical channel is first mapped to a virtual resource block. Thereafter, the virtual resource block is mapped to a physical resource block. One physical resource block is defined in accordance with 7 continuous OFDM symbols or SC-FDMA symbols in the time domain and 12 continuous subcarriers in the frequency domain. That is, one physical resource block is configured to include (7×12) resource elements. One physical resource block corresponds to one slot in the time domain and corresponds to 180 kHz in the frequency domain. Numbers from 0 are attached to the physical resource blocks in the frequency domain.

Hereinafter, the physical channels and the physical signals transmitted in each subframe will be described.

Figure 4:
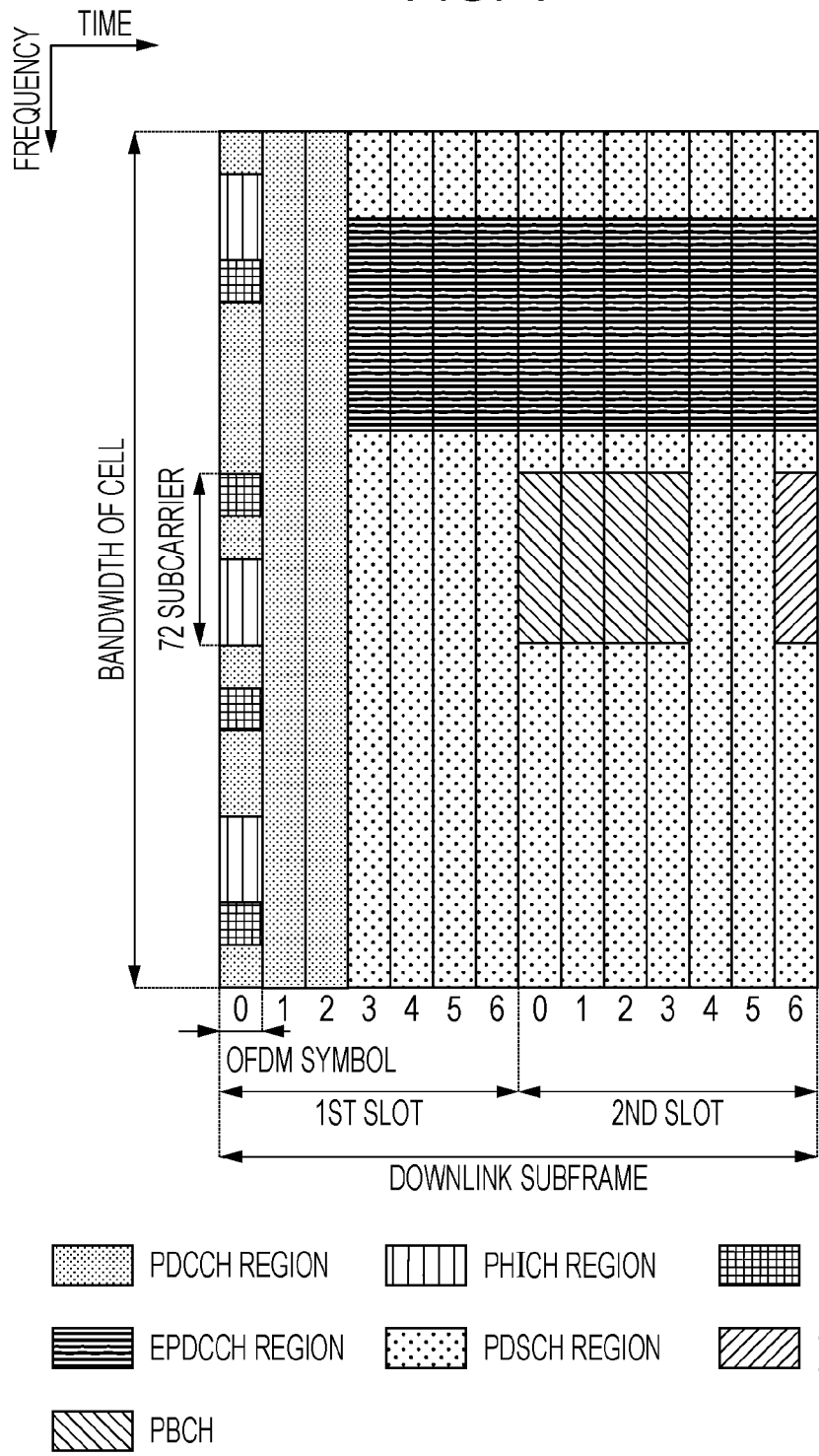
FIG. 4 is a diagram illustrating an arrangement example of physical channels and physical signals in a downlink subframe according to the embodiment.

FIG. 4 is a diagram illustrating an arrangement example of physical channels and physical signals in a downlink subframe according to the embodiment. In FIG. 4, the horizontal axis is a time axis and the vertical axis is a frequency axis. The base station device 3 may transmit the downlink physical channels (the PBCH, the PCFICH, the PHICH, the PDCCH, the EPDCCH, and the PDSCH) and the downlink physical signals (synchronization signals and downlink reference signals) in a downlink subframe. The PBCH is transmitted only with subframe 0 in the radio frame. The downlink reference signals are arranged in the resource elements distributed in the frequency domain and the time domain. To facilitate the description, the downlink reference signals are not illustrated in FIG. 4.

In the PDCCH region, the plurality of PDCCHs may be subjected to frequency and time multiplexing. In the EPDCCH region, the plurality of EPDCCHs may be subjected to frequency, time, and spatial multiplexing. In the PDSCH region, the plurality of PDSCHs may be subjected to frequency and spatial multiplexing. The PDCCH and the PDSCH or the EPDCCH may be subjected to time multiplexing. The PDSCH and the EPDCCH may be frequency multiplexing.

Figure 5:
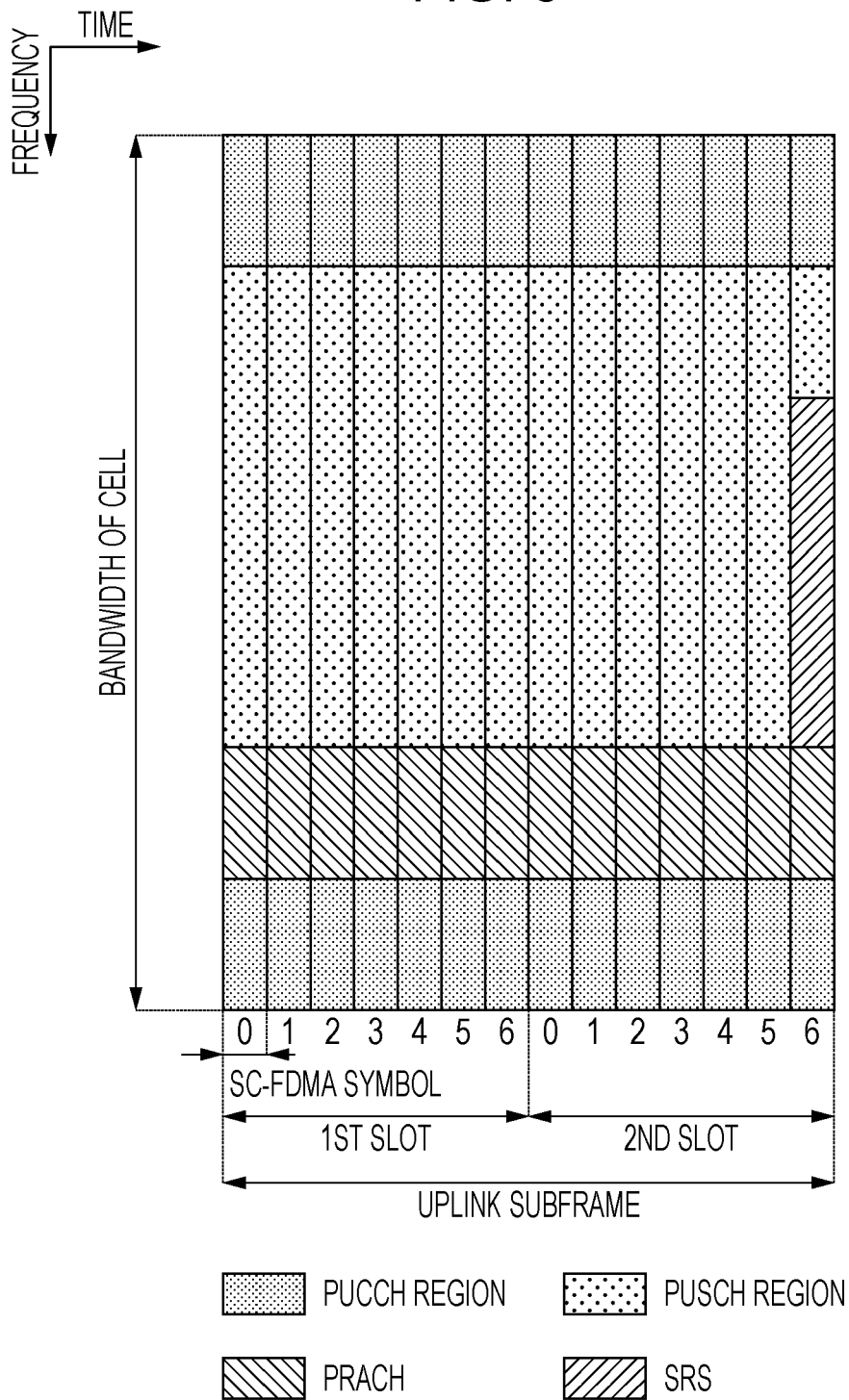
FIG. 5 is a diagram illustrating an arrangement example of physical channels and physical signals in an uplink subframe according to the embodiment.

FIG. 5 is a diagram illustrating an arrangement example of physical channels and physical signals in an uplink subframe according to the embodiment. In FIG. 5, the horizontal axis is a time axis and the vertical axis is a frequency axis. The mobile station device 1 may transmit the uplink physical channels (the PUCCH, the PUSCH, and the PRACH) and uplink physical signals (the DMRS and the SRS) in an uplink subframe. For example, in the PUCCH region, the plurality of PUCCHs are subjected to frequency, time, and code multiplexing. In the PUSCH region, the plurality of PUSCH may be subjected to the frequency and spatial multiplexing. The PUCCH and the PUSCH may be subjected to the frequency multiplexing. The PRACH may be disposed at a single subframe or two subframes. The plurality of PRACHs may be subjected to code multiplexing.

The SRS is transmitted using the final SC-FDMA symbol of the uplink subframe. That is, the SRS is disposed at the final SC-FDMA symbol in the uplink subframe. The mobile station device 1 cannot simultaneously transmit the SRS and the PUCCH/PUSCH/PRACH using the single SC-FDMA symbol in a single cell. The mobile station device 1 can transmit the PUSCH and/or the PUCCH using the SC-FDMA symbols excluding the final SC-FDMA symbol in the uplink subframe of the single cell and can transmit the SRS using the final SC-FDMA symbol in the uplink subframe with the uplink subframe. That is, the mobile station device 1 can transmit both of the SRS and the PUSCH/PUCCH in the single uplink subframe of the single cell. The DMRS is subjected to the time multiplexing along with the PUCCH or the PUSCH. Here, to facilitate the description, the DMRS is not illustrated in FIG. 5.

Figure 6:
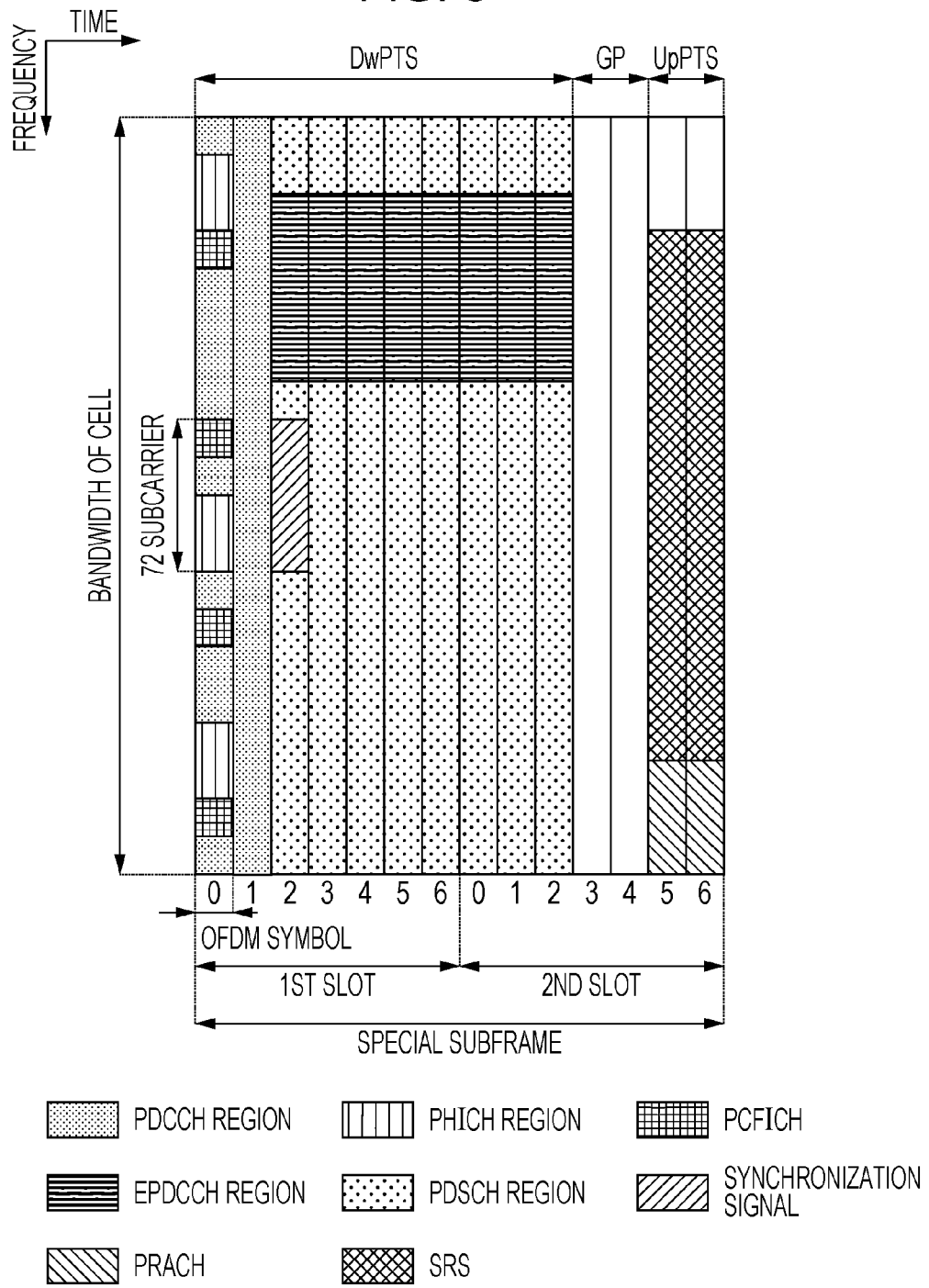
FIG. 6 is a diagram illustrating an arrangement example of physical channels and physical signals in a special subframe according to the embodiment.

FIG. 6 is a diagram illustrating an arrangement example of physical channels and physical signals in a special subframe according to the embodiment. In FIG. 6, the horizontal axis is a time axis and the vertical axis is a frequency axis. In FIG. 6, the DwPTS is configured to include the 1st to 10th SC-FDMA symbols in the special subframe. The GP is configured to include the 11th to 12th SC-FDMA symbols in the special subframe. The UpPTS is configured to include the 13 th, to 14 th SC-FDMA symbols in the special subframe.

The base station device 3 may transmit the PCFICH, the PHICH, the PDCCH, the EPDCCH, the PDSCH, a synchronization signal, and a downlink reference signal in the DwPTS of the special subframe. The base station device 3 does not transmit the PBCH in the DwPTS of the special subframe. The mobile station device 1 may transmit the PRACH and the SRS in the UpPTS of the special subframe. That this, the terminal device 1 does not transmit the PUCCH, the PUSCH, and the DMRS in the UpPTS of the special subframe.

Figure 7:
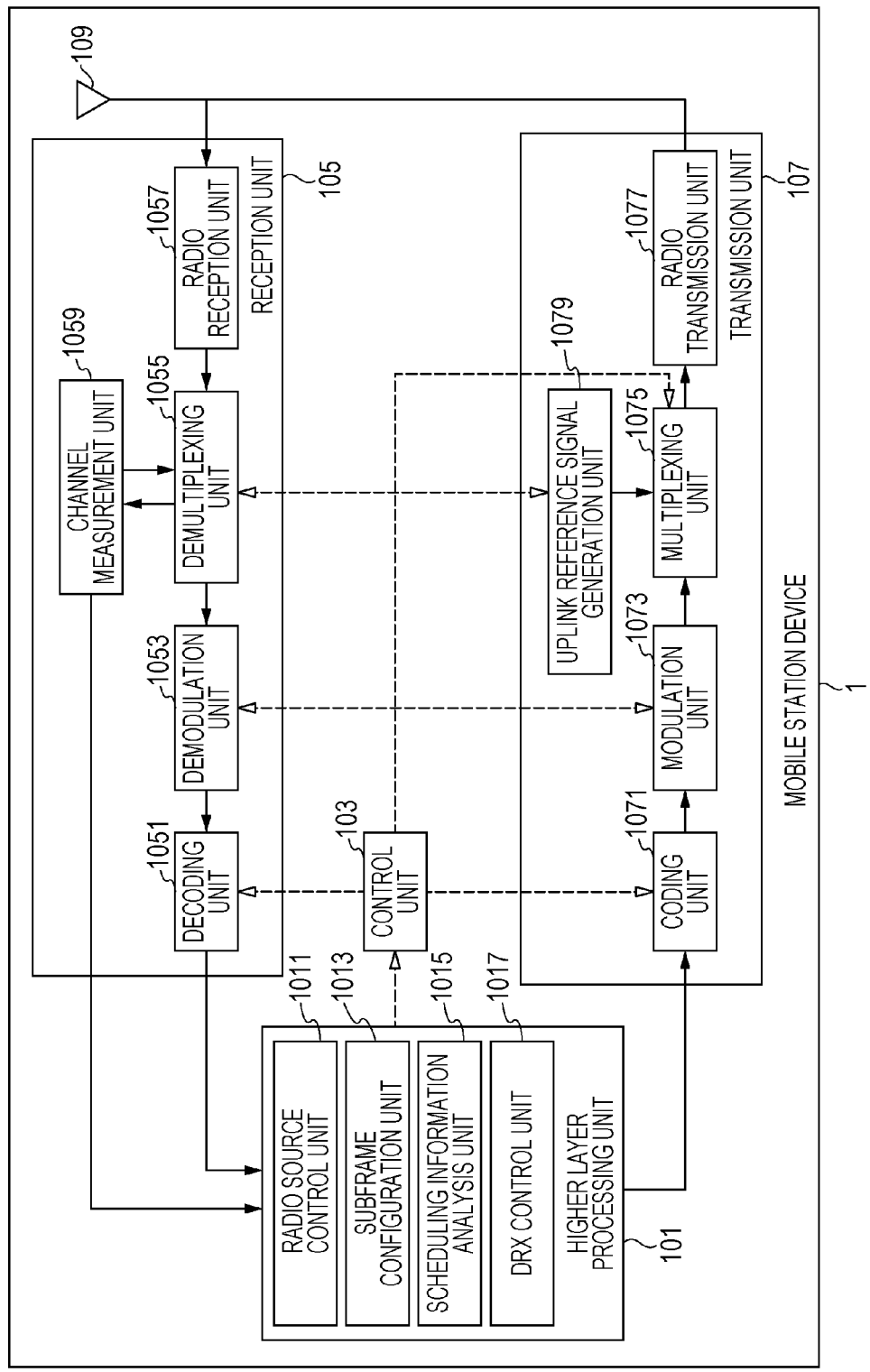
FIG. 7 is a schematic block diagram illustrating the structure of a mobile station device 1 according to the embodiment.

FIG. 7 is a schematic block diagram illustrating the structure of the mobile station device 1 according to the embodiment. As illustrated, the mobile station device 1 is configured to include a higher layer processing unit 101, a control unit 103, a reception unit 105, a transmission unit 107, and a transmission and reception antenna 109. The higher layer processing unit 101 is configured to include a radio resource control unit 1011, a subframe configuration unit 1013, a scheduling information analysis unit 1015, and a Discontinuous Reception (DRX) control unit 1017. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data (transport block) generated through a user operation or the like to the transmission unit 107. The higher layer processing unit 101 performs processes for a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various kinds of setting information regarding the own device. The radio resource control unit 1011 generates information disposed in each uplink channel and outputs the information to the transmission unit 107.

The subframe configuration unit 1013 included in the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration.

The subframe configuration unit 1013 sets the first uplink reference UL-DL configuration, the first downlink reference UL-DL configuration, the second uplink reference UL-DL configuration, the second downlink reference UL-DL configuration, and the transmission direction UL-DL configuration.

The scheduling information analysis unit 1015 included in the higher layer processing unit 101 analyzes the DCI format (scheduling information) received via the reception unit 105, generates control information to control the reception unit 105 and the transmission unit 107 based on the result obtained by analyzing the DCI format, and outputs the control information to the control unit 103.

The scheduling information analysis unit 1015 decides timings of a transmission process and a reception process based on the first uplink reference UL-DL configuration, the first downlink reference UL-DL configuration, the second uplink reference UL-DL configuration, the second downlink reference UL-DL configuration, and/or the transmission direction UL-DL configuration.

The DRX control unit 1017 specifies (selects or decides) the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control unit 1017 performs a DRX process based on the PDCCH subframe. The DRX control unit 1017 manages a timer related to the DRX based on the PDCCH subframe.

The DRX control unit 1017 instructs the reception unit 105 to monitor the PDCCH/EPDCCH in a subframe. The monitoring of the PDCCH/EPDCCH means an attempt to decode the PDCCH or the EPDCCH according to a certain DCI format.

The control unit 103 generates control signals for controlling the reception unit 105 and the transmission unit 107 based on the control information from the higher layer processing unit 101. The control unit 103 outputs the generated control signals to the reception unit 105 and the transmission unit 107 and controls the reception unit 105 and the transmission unit 107.

The reception unit 105 separates, demodulates, and decodes a received signal received from the base station device 3 via the transmission and reception antenna 109 in accordance with the control signals input from the control unit 103, and outputs the decoded information to the higher layer processing unit 101.

The radio reception unit 1057 converts (downconverts) a downlink signal received via the transmission and reception antenna 109 into an intermediate frequency, removes unnecessary frequency components, controls an amplification level so that a signal level is appropriately maintained, performs orthogonal demodulation based on an in-phase component and an orthogonal component of the received signal, and converts an analog signal subjected to the orthogonal demodulation into a digital signal. The radio reception unit 1057 removes a portion corresponding to a Guard Interval (GI) from the converted digital signal and performs Fast Fourier Transform (FFT) on the signal from which the guard interval is removed and extracts a signal of the frequency domain.

The demultiplexing unit 1055 demultiplexes the extracted signal into the PHICH, the PDCCH, the EPDCCH, the PDSCH, and the downlink reference signal. The demultiplexing unit 1055 compensates propagation paths of the PHICH, the PDCCH, the EPDCCH, and the PDSCH from estimated values of the propagation paths input from the channel measurement unit 1059. The demultiplexing unit 1055 outputs the demultiplexed downlink reference signal to the channel measurement unit 1059.

The demodulation unit 1053 multiples and combines codes corresponding to the PHICH, demodulates the combined signal in conformity to a Binary Phase Shift Keying (BPSK) modulation scheme, and outputs a demodulated signal to the decoding unit 1051. The decoding unit 1051 decodes the PHICH destined for the own device and outputs the decoded HARQ indicator to the higher layer processing unit 101. The demodulation unit 1053 demodulates the PDCCH and/or the EPDCCH in conformity to a QPSK modulation scheme and outputs the demodulated signal to the decoding unit 1051. The decoding unit 1051 attempts to decode the PDCCH and/or the EPDCCH. When the decoding succeeds, the decoded downlink control information and the RNTI corresponding to the downlink control information are output to the higher layer processing unit 101.

The demodulation unit 1053 demodulates the PDSCH in conformity to a demodulation scheme reported with the downlink grant, such as Quandrature Phase Shift Keying (QPSK), 16 Quandrature Amplitude Modulation (QAM), or 64 QAM, and outputs the demodulated results to the decoding unit 1051. The decoding unit 1051 performs decoding based on information regarding a coding ratio reported with the downlink control information and outputs the decoded downlink data (transport block) to the higher layer processing unit 101.

The channel measurement unit 1059 measures a downlink path loss or channel state from the downlink reference signal input from the demultiplexing unit 1055 and outputs the measured path loss or the channel state to the higher layer processing unit 101. The channel measurement unit 1059 calculates an estimated value of the downlink propagation path from the downlink reference signal and outputs the estimated value of the downlink propagation path to the demultiplexing unit 1055.

The transmission unit 107 generates an uplink reference signal according to the control signal input from the control unit 103, codes and modulates the uplink data (the transport block) input from the higher layer processing unit 101, multiplexes the PUCCH, the PUSCH, and the generated uplink reference signal, and transmits the multiplexed signal to the base station device 3 via the transmission and reception antenna 109.

The coding unit 1071 performs coding, such as convolution coding or block coding, on the uplink control information input from the higher layer processing unit 101. The coding unit 1071 performs turbo coding based on information used to schedule the PUSCH.

The modulation unit 1073 modulates coded bits input from the coding unit 1071 in conformity to a modulation scheme, such as BPSK, QPSK, 16 QAM, or 64 QAM, reported with the downlink control information or a modulation scheme decided in advance for each channel. The modulation unit 1073 decides the number of series of data subjected to spatial multiplexing based on the information used to schedule the PUSCH, maps a plurality of pieces of uplink data transmitted with the same PUSCH to the plurality of series by using Multiple Input Multiple Output Spatial Multiplexing (MIMO SM), and performs precoding on the series.

The uplink reference signal generation unit 1079 generates a series obtained by a pre-decided rule (expression) based on a Physical Cell Identity (PCI) (referred to as a cell ID or the like) for identifying the base station device 3, a bandwidth in which the uplink reference signal is disposed, cyclic shift reported with an uplink grant, a value of a parameter for generating a DMRS sequence, and the like. The multiplexing unit 1075 sorts the modulation symbols of the PUSCH in parallel according to the control signal input from the control unit 103, and then performs Discrete Fourier Transform (DFT). The multiplexing unit 1075 multiplexes the signals of the PUCCH and the PUSCH and the generated uplink reference signal for each transmission antenna port. That is, the multiplexing unit 1075 disposes the signals of the PUCCH and the PUSCH and the generated uplink reference signal in the resource elements for each transmission antenna port.

The radio transmission unit 1077 performs Inverse Fast Fourier Transform (IFFT) on the multiplexed signal, performs modulation of an SC-FDMA scheme, adds the guard interval to the SC-FDMA symbol subjected to the SC-FDMA modulation, generates a baseband digital signal, converts the baseband digital signal into an analog signal, generates an in-phase component and an orthogonal component of an intermediate frequency from the analog signal, removes excessive frequency component in regard to an intermediate frequency band, converts (upconverts) the signal of the intermediate frequency into a signal of a high frequency, removes an excessive frequency component, performs power amplification, and outputs the signal to the transmission and reception antenna 109 to transmit the signal.

Figure 8:
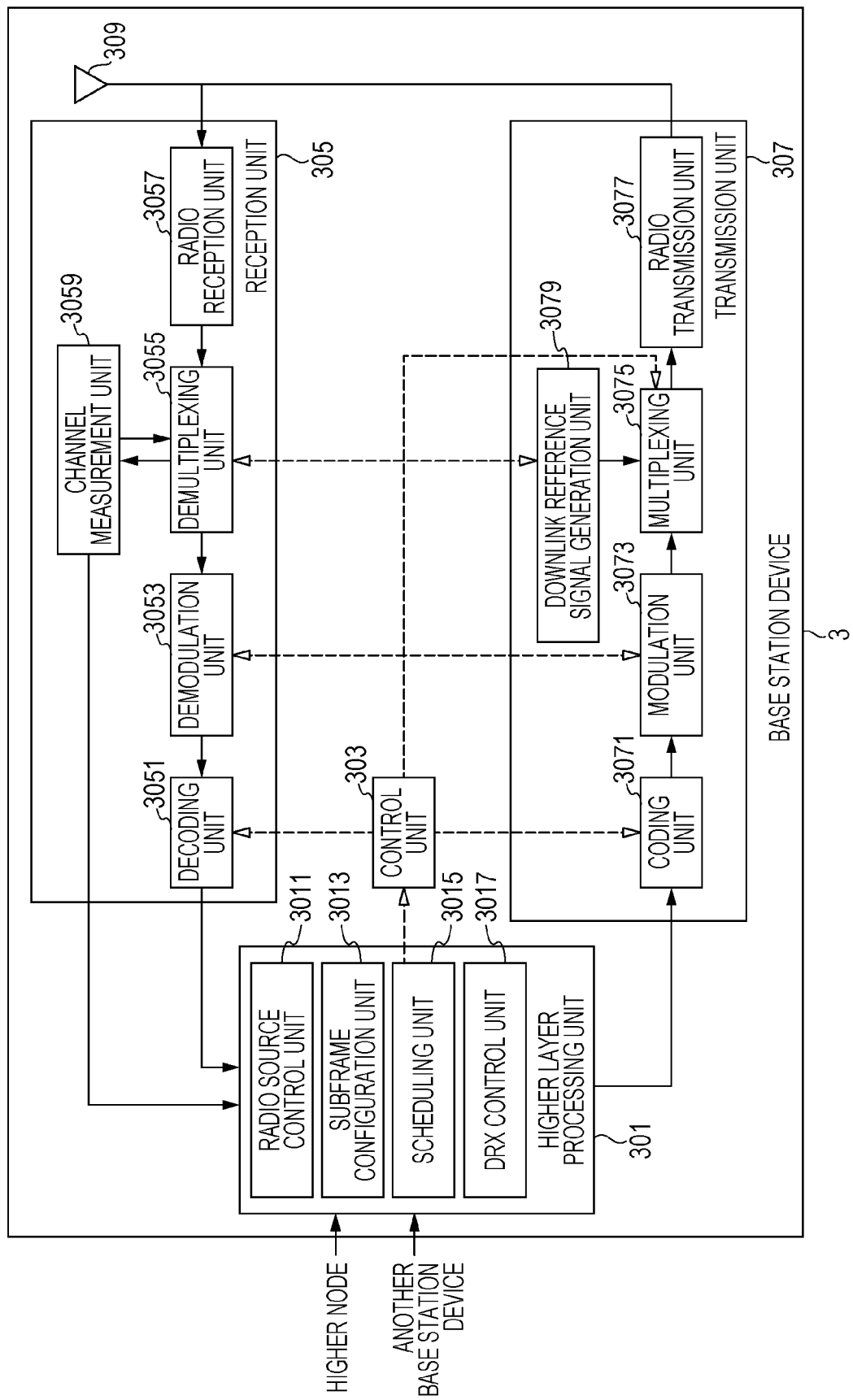
FIG. 8 is a schematic block diagram illustrating the structure of a base station device 3 according to the embodiment.

FIG. 8 is a schematic block diagram illustrating the structure of the base station device 3 according to the embodiment. As illustrated, the base station device 3 is configured to include a higher layer processing unit 301, a control unit 303, a reception unit 305, a transmission unit 307, and a transmission and reception antenna 309. The higher layer processing unit 301 is configured to include a radio resource control unit 3011, a subframe configuration unit 3013, a scheduling unit 3015, and a DRX control unit 3017. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processes for a Medium Access Control (MAC) layer, a Packet Data Convergence Protocol (PDCP) layer, a Radio Link Control (RLC) layer, and a Radio Resource Control (RRC) layer. The higher layer processing unit 301 generates control information to control the reception unit 305 and the transmission unit 307 and outputs the control information to the control unit 303.

The radio resource control unit 3011 included in the higher layer processing unit 301 generates downlink data (transport block) disposed in the downlink PDSCH, system information, an RRC message, a MAC Control Element (CE), and the like or acquires the downlink data, the downlink PDSCH, the system information, the RRC message, the MAC CE, and the like or acquires them from a higher node, and outputs them to the transmission unit 307. The radio resource control unit 3011 manages various kinds of setting information regarding each mobile station device 1.

The subframe configuration unit 3013 included in the higher layer processing unit 301 manages the first uplink reference UL-DL configuration, the first downlink reference UL-DL configuration, the second uplink reference UL-DL configuration, the second downlink reference UL-DL configuration, and the transmission direction UL-DL configuration in each mobile station device 1.

The subframe configuration unit 3013 sets the first uplink reference UL-DL configuration, the first downlink reference UL-DL configuration, the second uplink reference UL-DL configuration, the second downlink reference UL-DL configuration, and the transmission direction UL-DL configuration in each mobile station device 1.

The subframe configuration unit 3013 generates first information indicating the first uplink reference UL-DL configuration, second information indicating the first downlink reference UL-DL configuration, and third information indicating the transmission direction UL-DL configuration. The subframe configuration unit 3013 transmits the first information, the second information, and the third information to the mobile station device 1 via the transmission unit 307.

The base station device 3 may decide the first uplink reference UL-DL configuration, the first downlink reference UL-DL configuration, the second uplink reference UL-DL configuration, the second downlink reference UL-DL configuration, and/or the transmission direction UL-DL configuration in the mobile station device 1. The base station device 3 may be instructed to perform the first uplink reference UL-DL configuration, the first downlink reference UL-DL configuration, the second uplink reference UL-DL configuration, the second downlink reference UL-DL configuration, and/or the transmission direction UL-DL configuration in the mobile station device 1 by a higher node.

For example, the subframe configuration unit 3013 may decide the first uplink reference UL-DL configuration, the first downlink reference UL-DL configuration, the second uplink reference UL-DL configuration, the second downlink reference UL-DL configuration, and/or the transmission direction UL-DL configuration based on an amount of uplink traffic and an amount of downlink traffic.

The scheduling unit 3015 included in the higher layer processing unit 301 decides a frequency and a subframe to which the physical channels (the PDSCH and the PUSCH) are allocated and a coding ratio, a modulation scheme, transmission power, and the like of the physical channels (the PDSCH and the PUSCH) based on the estimated value of the propagation path, channel quality, or the like input from the channel measurement unit 3059. The scheduling unit 3015 decides whether to schedule the downlink physical channel and/or the downlink physical signal or schedule the uplink physical channel and/or the uplink physical signal in a flexible subframe. The scheduling unit 3015 generates control information (for example, the DCI format) to control the reception unit 305 and the transmission unit 307 based on the scheduling result and outputs the control information to the control unit 303.

The scheduling unit 3015 generates information used to schedule the physical channels (the PDSCH and the PUSCH) based on the scheduling result. The scheduling unit 3015 decides timings at which a transmission process and a reception process are performed based on the first uplink reference UL-DL configuration, the first downlink reference UL-DL configuration, the second uplink reference UL-DL configuration, the second downlink reference UL-DL configuration, and/or the transmission direction UL-DL configuration.

The DRX control unit 3017 included in the higher layer processing unit 301 specifies (selects or decides) the PDCCH subframe based on the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control unit 3017 manages a timer related to the DRX based on the foregoing PDCCH subframe. The DRX control unit 3017 determines whether the mobile station device 1 monitors the PDCCH/EPDCCH in the subframe. The DRX control unit 3017 notifies the scheduling unit 3015 of the determined result.

The control unit 303 generates control signals to control the reception unit 305 and the transmission unit 307 based on the control information from the higher layer processing unit 301. The control unit 303 outputs the generated control signals to the reception unit 305 and the transmission unit 307 and controls the reception unit 305 and the transmission unit 307.

The reception unit 305 separates, demodulates, and decodes a received signal received from the mobile station device 1 via the transmission and reception antenna 309 in accordance with the control signals input from the control unit 303, and outputs the decoded information to the higher layer processing unit 301. The radio reception unit 3057 converts (downconverts) an uplink signal received via the transmission and reception antenna 309 into an intermediate frequency, removes unnecessary frequency components, controls an amplification level so that a signal level is appropriately maintained, performs orthogonal demodulation based on an in-phase component and an orthogonal component of the received signal, and converts an analog signal subjected to the orthogonal demodulation into a digital signal.

The radio reception unit 3057 removes a portion corresponding to a Guard Interval (GI) from the converted digital signal. The radio reception unit 3057 performs Fast Fourier Transform (FFT) on the signal from which the guard interval is removed, extracts a signal of the frequency domain, and outputs the signal to the demultiplexing unit 3055.

The demultiplexing unit 1055 demultiplexes the signal input from the radio reception unit 3057 into the PUCCH, the PUSCH, and the uplink reference signal. The signal is demultiplexed based on allocation information of radio resources decided in advance by the radio resource control unit 3011 of the base station device 3 and included in the uplink grant reported by each mobile station device 1. The demultiplexing unit 3055 compensates propagation paths of the PUCCH and the PUSCH from estimated values of the propagation paths input from the channel measurement unit 3059. The demultiplexing unit 3055 outputs the demultiplexed uplink reference signal to the channel measurement unit 3059.

The demodulation unit 3053 performs Inverse Discrete Fourier Transform (IDFT) on the PUSCH, acquires the modulation symbol, and demodulates the received signal using a modulation scheme, such as Binary Phase Shift Keying (BPSK), QPSK, 16 QAM, or 64 QAM, decided in advance for each modulation symbol of the PUCCH and the PUSCH or notified of each mobile station device 1 by the own device in advance with the uplink grant. The demodulation unit 3053 demultiplexes the modulation symbol of the plurality of pieces of uplink data transmitted with the same PUSCH by using the MIMO SM based on the number of series notified of each mobile station device 1 and subjected to the spatial multiplexing in advance with the uplink grant and information instructing precoding performed on the series.

The decoding unit 3051 decodes coded bits of the demodulated PUSCH and PUSCH at a coding ratio of a pre-decided coding scheme decided in advance or notified of the mobile station device 1 by the own device in advance with the uplink grant and outputs the decoded uplink data and the uplink control information to the higher layer processing unit 101. When the PUSCH is retransmitted, the decoding unit 3051 performs the decoding by using the coded bits input from the higher layer processing unit 301 and retained in an HARQ buffer and the demodulated coded bits. The channel measurement unit 309 measures an estimated value of the propagation path, equality of the channel, and the like from the uplink reference signal input from the demultiplexing unit 3055 and outputs the estimated value of the propagation path, the quality of the channel, and the like to the demultiplexing unit 3055 and the higher layer processing unit 301.

The transmission unit 307 generates a downlink reference signal according to the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the multiplexed signal to the mobile station device 1 via the transmission and reception antenna 309.

The coding unit 3071 performs coding, such as convolution coding or turbo coding, on the HARQ indicator, the downlink control information, and the downlink data input from the higher layer processing unit 301 by using a pre-decided coding scheme. Alternatively, the coding unit 3071 performs the coding by using a coding scheme decided by the radio resource control unit 3011. The modulation unit 3073 modulates coded bits input from the coding unit 3071 in conformity to a modulation scheme, such as BPSK, QPSK, 16 QAM, or 64 QAM, decided in advance or decided by the radio resource control unit 3011.

The downlink reference signal generation unit 3079 generates, as a downlink reference signal, a series known by the mobile station device 1 and obtained by a pre-decided rule based on a Physical Cell Identity (PCI) for identifying the base station device 3. The multiplexing unit 3075 multiplexes the modulated modulation symbol of each channel and the generated downlink reference signal. That is, the multiplexing unit 3075 disposes the modulated modulation symbol of each channel and the generated downlink reference signal in the resource elements.

The radio transmission unit 3077 performs Inverse Fast Fourier Transform (IFFT) on the multiplexed modulation symbol and the like, performs modulation of an OFDM scheme, adds the guard interval to the OFDM symbol subjected to the OFDM modulation, generates a baseband digital signal, converts the baseband digital signal into an analog signal, generates an in-phase component and an orthogonal component of an intermediate frequency from the analog signal, removes excessive frequency component in regard to an intermediate frequency band, converts (up-converts) the signal of the intermediate frequency into a signal of a high frequency, removes an excessive frequency component, performs power amplification, and outputs the signal to the transmission and reception antenna 309 to transmit the signal.

Hereinafter, the first uplink reference UL-DL configuration, the first downlink reference UL-DL configuration, the second uplink reference UL-DL configuration, the second downlink reference UL-DL configuration, and the transmission direction UL-DL configuration will be described.

The first uplink reference UL-DL configuration, the first downlink reference UL-DL configuration, the second uplink reference UL-DL configuration, the second downlink reference UL-DL configuration, and the transmission direction UL-DL configuration are defined in accordance with an uplink-downlink configuration (UL-DL configuration).

The uplink-downlink configuration is a configuration regarding a pattern of the subframes in the radio frame. The uplink-downlink configuration indicates that each subframe in the radio frame is one of the downlink subframe, the uplink subframe, and the special subframe.

That is, the first uplink reference UL-DL configuration, the second uplink reference UL-DL configuration, the first downlink reference UL-DL configuration, the second downlink reference UL-DL configuration, and the transmission direction UL-DL configuration are defined by the pattern of the downlink subframe, the uplink subframe, and the special subframe in the radio frame.

The pattern of the downlink subframe, the uplink subframe, and the special subframe indicates that each of subframes #0 to #9 is one of the downlink subframe, the uplink subframe, and the special subframe. Preferably, the pattern is expressed by any combination in which the length of D, U, and S (indicate the downlink subframe, the uplink subframe, and the special subframe, respectively) is 10.

More preferably, the beginning subframe (that is, subframe #0) is D and the second subframe (that is, subframe #1) is S.

FIG. 9 is a table illustrating an example of the uplink-downlink configuration according to the embodiment. In FIG. 9, D indicates the downlink subframe, U indicates the uplink subframe, and S indicates the special subframe.

In FIG. 9, subframe 1 in the radio frame is normally the special subframe. In FIG. 9, subframes 0 and 5 are reserved normally for downlink transmission and subframe 2 is reserved normally for uplink transmission.

In FIG. 9, when the downlink-uplink switch-point periodicity is 5 ms, subframe 6 in the radio frame is the special subframe. When the downlink-uplink switch-point periodicity is 10 ms, subframe 6 in the radio frame is the downlink subframe.

The first uplink reference UL-DL configuration is also referred to as a first parameter, a first configuration, or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

Setting of an uplink-downlink configuration i as the first or second uplink reference UL-DL configuration is referred to as setting of a first or second uplink reference UL-DL configuration i. Setting of the uplink-downlink configuration i as the first or second downlink reference UL-DL configuration is referred to as setting of a first or second downlink reference UL-DL configuration i. Setting of an uplink-downlink configuration i as the transmission direction UL-DL configuration is referred to as setting of a transmission direction UL-DL configuration i.

Hereinafter, methods of setting the first uplink reference UL-DL configuration, the first downlink reference UL-DL configuration, and the transmission direction UL-DL configuration will be described.

The base station device 3 sets the first uplink reference UL-DL configuration, the first downlink UL-DL configuration, and the transmission direction UL-DL configuration. The base station device 3 may include the first information (TDD-Config) indicating the first uplink reference UL-DL configuration, the second information indicating the first downlink reference UL-DL configuration, and the third information indicating the transmission direction UL-DL configuration in at least one of the MIB, the system information block type 1 message, the system information message, the RRC message, the MAC Control Element (CE), and the control information (for example, the DCI format) of the physical layer to transmit the first information, the second information, and the third information. Depending on a situation, the base station device 3 may include the first information, the second information, and the third information in any of the MIB, the system information block type 1 message, the system information message, the RRC message, the MAC Control Element (CE), the control information (for example, the DCI format) of the physical layer.

For each of a plurality of serving cells, the first uplink reference UL-DL configuration, the second uplink reference UL-DL configuration, the first downlink reference UL-DL configuration, the second downlink reference UL-DL configuration, and the transmission direction UL-DL configuration may be defined.

For each serving cell, the base station device 3 transmits the first information, the second information, and the third information to the mobile station device 1 in which the plurality of serving cells are set. For each serving cell, the first information, the second information, and the third information may be defined.

The base station device 3 may transmit, to the mobile station device 1 in which two serving cells structured as one primary cell and one secondary cell are set, the first information in regard to the primary cell, the second information in regard to the primary cell, the third information in regard to the primary cell, the first information in regard to the secondary cell, the second information in regard to the secondary cell, and the third information in regard to the secondary cell.

The mobile station device 1 in which the plurality of serving cells are set may set the first uplink reference UL-DL configuration, the first downlink reference UL-DL configuration, and the transmission direction DL-UL configuration based on the first information, the second information, and the third information in regard to each serving cell.

The mobile station device 1 in which to two serving cells structured as one primary cell and one secondary cell are set may set the first uplink reference UL-DL configuration in regard to the primary cell, the first downlink reference UL-DL configuration in regard to the primary cell, the transmission direction DL-UL configuration, the first uplink reference UL-DL configuration in regard to the secondary cell, the first downlink reference UL-DL configuration in regard to the secondary cell, and the transmission direction DL-UL configuration in regard to the secondary cell.

The first information in regard to the primary cell is preferably included in the system information block type 1 message or the RRC message. The first information in regard to the secondary cell is preferably included in the RRC message. The second information in regard to the primary cell is preferably included in the system information block type 1 message, the system information message, or the RRC message. The second information in regard to the secondary cell is preferably included in the RRC message. The third information is preferably included in the MIB, the MAC CE, or the control information (for example, the DCI format) of the physical layer.

The first information is preferably common to the plurality of mobile station devices 1 in the cell. The second information may be common to the plurality of mobile station devices 1 in the cell or may be dedicated to the mobile station device 1. The third information may be common to the plurality of mobile station devices 1 in the cell or may be dedicated to the mobile station device 1.

The second information may be transmitted along with the first information. The mobile station device 1 in which the first downlink reference UL-DL configuration is not set based on the second information may not receive the third information.

A periodicity at which the transmission direction UL-DL configuration is changed is preferably shorter than a periodicity at which the downlink reference UL-DL configuration is changed. A frequency at which the transmission direction UL-DL configuration is changed is preferably not less than a frequency at which the downlink reference UL-DL configuration is changed. A periodicity at which the downlink reference UL-DL configuration is changed is preferably shorter than a periodicity at which the uplink reference UL-DL configuration is changed. A frequency at which the downlink reference UL-DL configuration is changed is preferably not less than a frequency at which the uplink reference UL-DL configuration is changed.

The system information block type 1 message is initially transmitted via the PDSCH with subframe 5 of a radio frame in which "SFN mod 8=0" is satisfied, and the system information block type 1 message is retransmitted (repeated) with subframe 5 of all the other radio frames satisfying "SFN mode 2=0". The system information block type 1 message includes information indicating the structure (the length of the DwPTS, the GP, and the UpPTS) of the special subframe. The system information block type 1 message is cell-unique information.

The system information message is transmitted via the PDSCH. The system information message is cell-unique information. The system information message includes a system information block X other than system information block type 1.

The RRC message is transmitted via the PDSCH. The RRC message is information/signal processed in an RRC layer. The RRC message may be common to the plurality of mobile station devices 1 in the cell or may be dedicated to a specific mobile station device 1.

The MAC CE is transmitted via the PDSCH. The MAC CE is information/signal processed in a MAC layer.

When the mobile station device 1 receives the RRC message including the first information and/or the second information and/or the third information via the PDSCH, the mobile station device 1 preferably sets (validates) the first uplink reference UL-DL configuration and/or the first downlink reference UL-DL configuration and/or the transmission direction UL-DL configuration in the subframe (timing) with which a RRC Connection Reconfiguration Complete message corresponding to the RRC message is transmitted.

When the mobile station device 1 receives the MIB including the first information and/or the second information and/or the third information in subframe n−k via the PBCH, the mobile station device 1 preferably sets (validates) the first uplink reference UL-DL configuration/first downlink reference UL-DL configuration and/or the transmission direction UL-DL configuration in subframe n. For example, k is 4 or 8. For example, k is decided based on the table of FIG. 21 and the current first or second downlink reference UL-DL configuration. The description of FIG. 21 will be described below.

When the mobile station device 1 receives the MAC CE including the first information and/or the second information and/or the third information in subframe n−k via the PDSCH, the mobile station device 1 preferably sets (validates) the first uplink reference UL-DL configuration and/or the first downlink reference UL-DL configuration and/or the transmission direction UL-DL configuration in subframe n. For example, k is 4 or 8. For example, subframe n+k is a subframe with which the HARQ-ACK (ACK) for the PDSCH used to transmit the MAC CE is transmitted. For example, k is decided based on the table of FIG. 21 and the current first or second downlink reference UL-DL configuration.

When the mobile station device 1 receives the control information (for example, the DCI format) of the physical layer including the first information and/or the second information and/or the third information in subframe n−k via the downlink physical channel (for example, the PDCCH/EPDCCH), the mobile station device 1 preferably sets (validates) the first uplink reference UL-DL configuration and/or the first downlink reference UL-DL configuration and/or the transmission direction UL-DL configuration in subframe n. For example, k is 4 or 8. For example, subframe n+k is a subframe with which the HARQ-ACK (ACK) for the downlink physical channel (for example, the PDCCH/EPDCCH) used to transmit the control information (for example, the DCI format) of the physical layer is transmitted. For example, k is decided based on the table of FIG. 21 and the current first or second downlink reference UL-DL configuration.

The mobile station device 1 that receives the first information in regard to a certain serving cell and does not receive the second information in regard to the certain serving cell and the base station device 3 that transmits the first information in regard to a certain serving cell and does not transmit the second information in regard to the certain serving cell may set the first downlink reference UL-DL configuration in regard to the certain serving cell based on the first information in regard to the certain serving cell. The mobile station device 1 may neglect the third information in regard to the serving cell in which the first downlink reference UL-DL configuration is set based on the first information.

Figure 10:
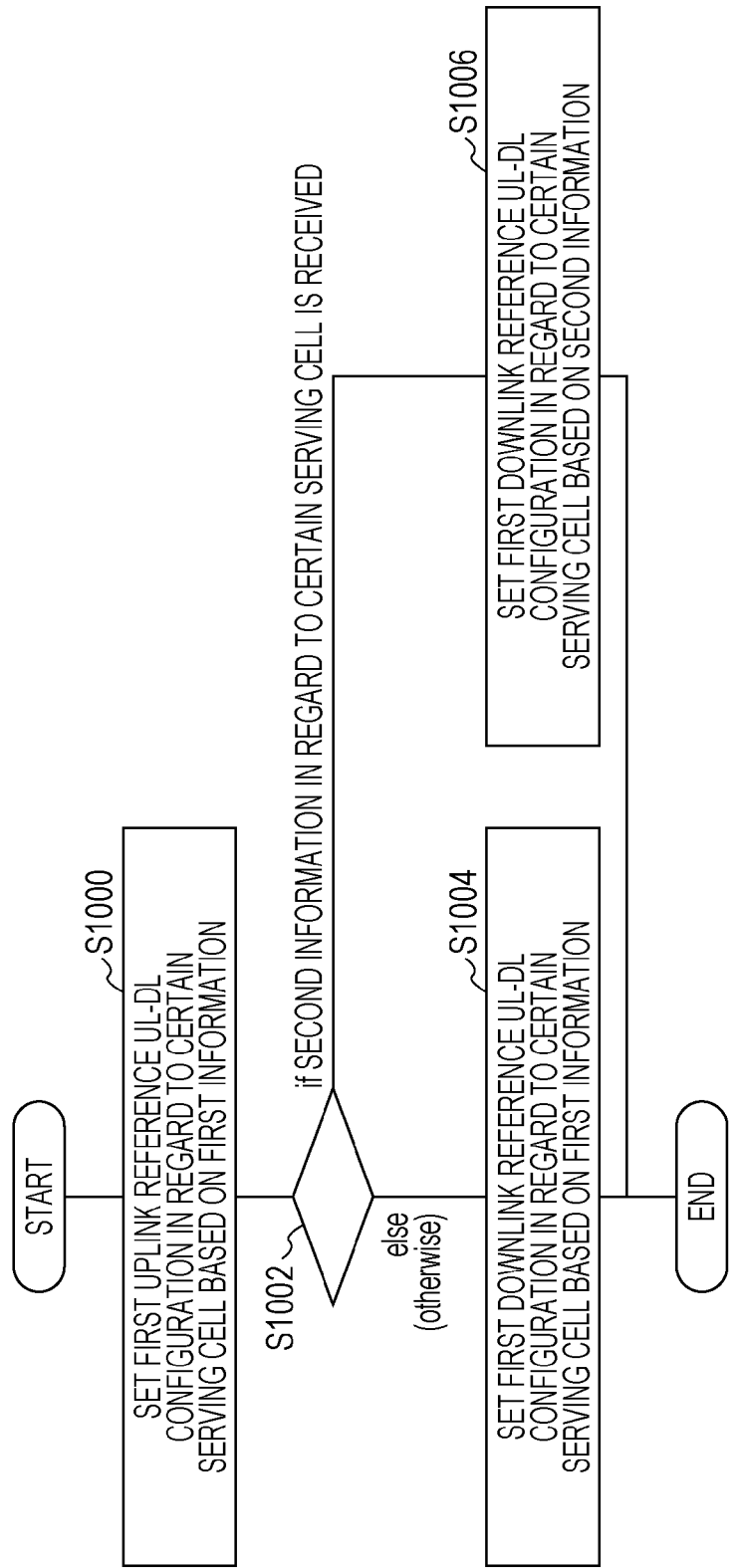
FIG. 10 is a flowchart illustrating a method of setting a first uplink reference UL-DL configuration and a first downlink reference UL-DL configuration according to the embodiment.

FIG. 10 is a flowchart illustrating the method of setting the first uplink reference UL-DL configuration and the first downlink reference UL-DL configuration according to the embodiment. The mobile station device 1 performs the setting method of FIG. 10 in each of the plurality of serving cells.

The mobile station device 1 sets the first uplink reference UL-DL configuration in regard to a certain serving cell based on the first information (S1000). The mobile station device 1 determines whether to receive the second information in regard to the certain serving cell (S1002). When the mobile station device 1 receives the second information in regard to the certain serving cell, the mobile station device 1 sets the first downlink reference UL-DL configuration in regard to the certain serving cell based on the second information in regard to the certain serving cell (S1006). When the mobile station device 1 does not receive the second information in regard to the certain serving cell (else/otherwise), the mobile station device 1 sets the first downlink reference UL-DL configuration in regard to the certain serving cell based on the first information in regard to the certain serving cell (S1004).

A serving cell in which the first uplink reference UL-DL configuration and the first downlink reference UL-DL configuration are set based on the first information is also referred to as a serving cell in which a dynamic TDD is not set. A serving cell in which the first downlink reference UL-DL configuration is set based on the second information is also referred to as a serving cell in which the dynamic TDD is set.

When the first downlink reference UL-DL configuration is reset in regard to the serving cell in which the transmission direction UL-DL configuration is set, the mobile station device 1 may clear/discard the transmission direction UL-DL configuration in regard to the serving cell.

When the reset first downlink reference UL-DL configuration is the same as the previous first downlink reference UL-DL configuration in regard to a serving cell in which the transmission direction UL-DL configuration is set, the mobile station device 1 may not clear/discard the transmission direction UL-DL configuration in regard to the serving cell. That is, when the first downlink reference UL-DL configuration is changed in regard to the serving cell in which the transmission direction UL-DL configuration is set, the mobile station device 1 may clear/discard the transmission direction UL-DL configuration in regard to the serving cell.

When the mobile station device 1 is instructed to reset/change the first downlink reference UL-DL configuration in regard to a serving cell in which the transmission direction UL-DL configuration is set, the base station device 3 may consider the mobile station device 1 to clear/discard the transmission direction UL-DL configuration in regard to the serving cell.

When the first uplink reference UL-DL configuration is reset in regard to a serving cell in which the first downlink reference UL-DL configuration and the transmission direction UL-DL configuration are set, the mobile station device 1 may clear/discard the first downlink reference UL-DL configuration and the transmission direction UL-DL configuration.

When the mobile station device 1 is instructed to reset/change the first uplink reference UL-DL configuration in regard to a serving cell in which the first downlink reference UL-DL configuration and the transmission direction UL-DL configuration are set, the base station device 3 may consider the mobile station device 1 to clear/discard the first downlink reference UL-DL configuration and the transmission direction UL-DL configuration in regard to the serving cell.

When the mobile station device 1 receives the second information, determines the subframe with which the uplink signal can be transmitted based on the second information, and subsequently monitors whether the third information is received, the mobile station device 1 determines the subframe with which an uplink signal can be transmitted based on the third information when the third information is received.

For example, the base station device 3 transmits the third information to the mobile station device 1 by using the PDCCH/EPDCCH. The third information is used to control an operation of the dynamic TDD within a coverage of the base station device 3 (cell). The third information is transmitted and received in a Common Search Space (CSS) or a UE-specific Search Space (USS).

The CSS is a region which is common to the plurality of mobile station devices 1 and in which monitoring of the PDCCH/EPDCCH is performed. The USS is a region which is defined based on at least the C-RNTI. The C-RNTI is an identifier which can be uniquely allocated to the mobile station device 1.

To transmit the DCI format including the third information (information used to give an instruction of a transmission direction of a subframe), the C-RNTI may be used. To transmit the DCI format including the third information (information used to give an instruction of a transmission direction of a subframe), an RNTI different from the C-RNTI and the SPS C-RNTI may be used. The RNTI is referred to as an X-RNTI. That is, the CRC parity bit added to the DCI format including the information of the third information is scrambled with the C-RNTI or the X-RNTI.

The subframe used for the mobile station device 1 to monitor the PDCCH/EPDCCH including the third information may be restricted. The base station device 3 may control the subframe used for the mobile station device 1 to monitor the PDCCH/EPDCCH including the third information. The base station device 3 may transmit information used to give an instruction of a subframe with which the mobile station device 1 monitors the PDCCH/EPDCCH including the third information to the mobile station device 1.

For example, the PDCCH/EPDCCH including the third information can be disposed at intervals of 10 subframes. For example, the mobile station device 1 monitors the third information at the intervals of 10 subframes. The subframe in which the PDCCH/EPDCCH including the third information can be disposed may be decided in advance. For example, the third information may be disposed only in subframe 0 or 5 of the radio frame.

Only when the base station device 3 determines that the third information is necessary, the base station device 3 transmits the third information. For example, when the base station device 3 determines that the transmission direction UL-DL configuration is changed, the base station device 3 transmits the third information. For example, when the base station device 3 determines that it is necessary to notify the mobile station device 1 starting an operation of the dynamic TDD of the third information, the base station device 3 transmits the third information.

The mobile station device 1 starting the operation of the dynamic TDD monitors the PDCCH/EPDCCH including the third information with the subframe in which the PDCCH/EPDCCH including the third information can be disposed.

Only when the mobile station device 1 is set so that the third information is monitored, the mobile station device 1 may monitor the third information. For example, only when the first downlink reference configuration is set, the mobile station device 1 may monitor the third information.

The mobile station device 1 attempts to decode a received signal and determines whether the PDCCH/EPDCCH including the third information is detected. When the PDCCH/EPDCCH including the third information is detected, the mobile station device 1 determines the subframe with which an uplink signal can be transmitted based on the detected third information. When the PDCCH/EPDCCH including the third information is not detected, the mobile station device 1 may maintain the past determination regarding the subframe with which the uplink signal can be transmitted.

Hereinafter, a method of setting the second uplink reference UL-DL configuration will be described.

When the plurality of serving cells are set in the mobile station device 1 and the first uplink reference UL-DL configuration is different between at least two serving cells, the mobile station device 1 and the base station device 3 set the second uplink reference UL-DL configuration.

Unless the plurality of serving cells are set in the mobile station device 1 and the first uplink reference UL-DL configuration is different between at least two serving cells, the mobile station device 1 and the base station device 3 may not set the second uplink reference UL-DL configuration.

Cases other than the case in which the first uplink reference UL-DL configuration is different between at least two serving cells are cases in which the first uplink reference UL-DL configurations are the same in all of the serving cells. When one serving cell is set in the mobile station device 1, the mobile station device 1 and the base station device 3 may not set the second uplink reference UL-DL configuration.

Figure 11:
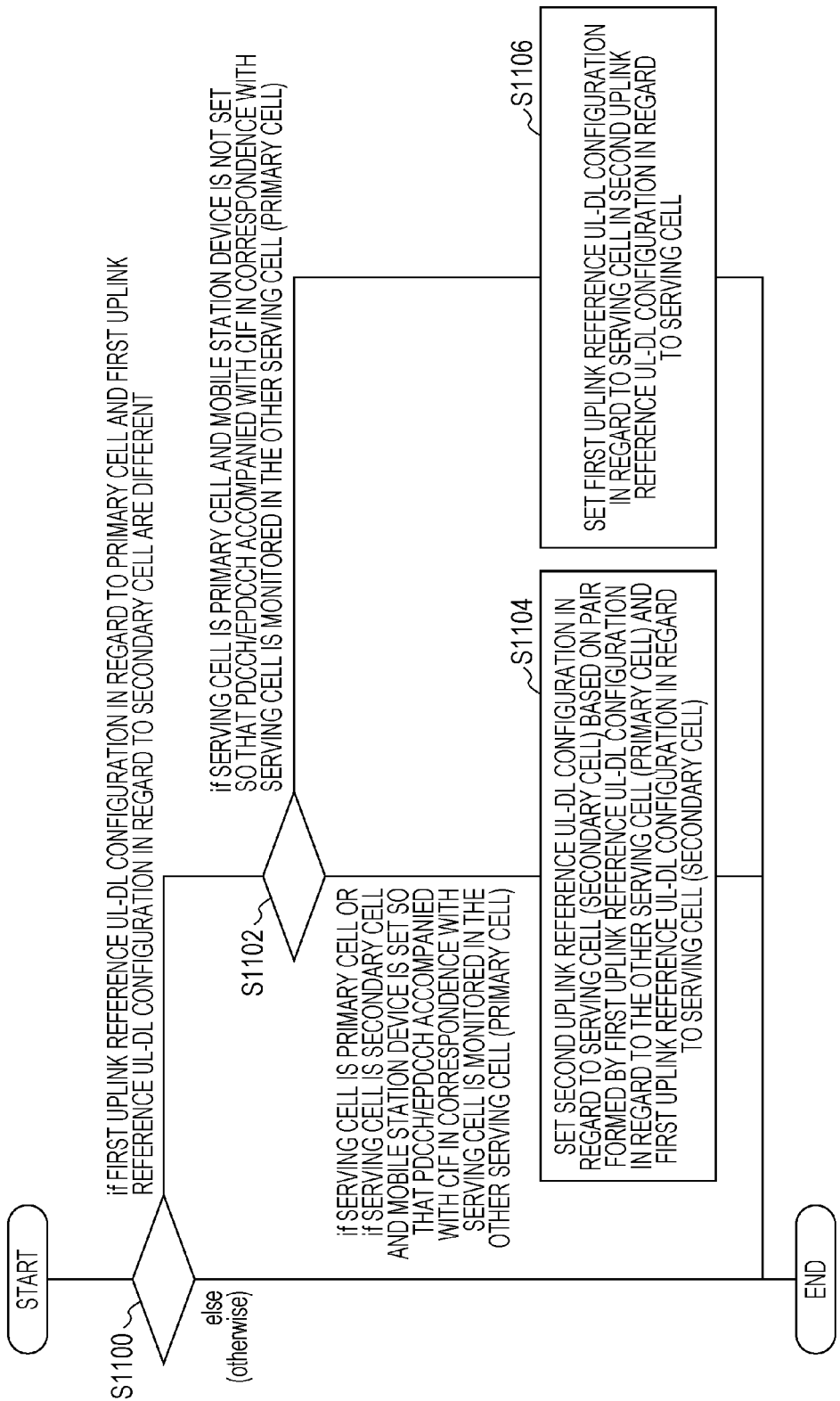
FIG. 11 is a flowchart illustrating a method of setting a second uplink reference UL-DL configuration according to the embodiment.

FIG. 11 is a flowchart illustrating the method of setting the second uplink reference UL-DL configuration according to the embodiment. In FIG. 11, one primary cell and one secondary cell are set in the mobile station device 1. The mobile station device 1 performs the setting method of FIG. 11 in regard to the primary cell and the secondary cell.

The mobile station device 1 determines whether the first uplink reference UL-DL configuration in regard to the primary cell and the first uplink reference UL-DL configuration in regard to the secondary cell are different (S1100). When the first uplink reference UL-DL configuration in regard to the primary cell and the first uplink reference UL-DL configuration in regard to the secondary cell are the same, the mobile station device 1 ends the process of setting the second uplink reference UL-DL configuration without setting the second uplink reference UL-DL configuration.

When the first uplink reference UL-DL configuration in regard to the primary cell and the first uplink reference UL-DL configuration in regard to the secondary cell are different, the mobile station device 1 determines whether the serving cell is the primary cell or the secondary cell and/or is set so that the mobile station device 1 monitors the PDCCH/EPDCCH accompanied with a Carrier Indicator Field (CIF) in correspondence with the serving cell in the other serving cell (S1102).

When the serving cell is the secondary cell and the motile station device 1 is set so that the mobile station device 1 monitors the PDCCH/EPDCCH accompanied with the CIF in correspondence with the serving cell (the secondary cell) in the other serving cell (the primary cell), the second uplink reference UL-DL configuration in regard to the serving cell (the secondary cell) is set based on a pair formed by the first uplink reference UL-DL configuration in regard to the other serving cell (the primary cell) and the first uplink reference UL-DL configuration in regard to the serving cell (the secondary cell) (S1104).

In S1104, the mobile station device 1 sets the second uplink reference UL-DL configuration in regard to the serving cell (the secondary cell) based on the table of FIG. 12. FIG. 12 is a diagram illustrating the pair formed by the first uplink reference UL-DL configuration in regard to the other serving cell (the primary cell) and the first uplink reference UL-DL configuration in regard to the serving cell (the secondary cell) and correspondence of the second uplink reference UL-DL configuration in regard to the secondary cell according to the embodiment.

In FIG. 12, for the primary cell UL-DL configuration, the first uplink reference UL-DL configuration in regard to the other serving cell (the primary cell) is referred to. In FIG. 12, for the secondary cell UL-DL configuration, the first uplink reference UL-DL configuration in regard to the serving cell (the secondary cell) is referred to.

For example, when first uplink reference UL-DL configuration 0 is set in the other serving cell (the primary cell) and first uplink reference UL-DL configuration 2 is set in the serving cell (the secondary cell), second uplink reference UL-DL configuration 1 is set in the secondary cell.

When the serving cell is the primary cell or the serving cell is the secondary cell and when the mobile station device 1 is not set so that mobile station device 1 monitors the PDCCH/EPDCCH accompanied with the CIF in correspondence with the serving cell (the secondary cell) in the other serving cell (the primary cell), the first uplink reference UL-DL configuration in regard to the serving cell is set in the second uplink reference UL-DL configuration in regard to the serving cell (S1106).

The base station device 3 sets the second uplink reference UL-DL configuration based on the setting method of FIG. 11.

The monitoring of the PDCCH/EPDCCH accompanied with the CIF means an attempt to decode the PDCCH or the EPDCCH according to the DCI format including the CIF. The CIF is a field to which a carrier indicator is mapped. A value of the carrier indicator indicates the serving cell to which the DCI format related to the carrier indicator corresponds.

The mobile station device 1 which is set so that the mobile station device 1 monitors the PDCCH/EPDCCH accompanied with the CIF in correspondence with the serving cell in the other serving cell monitors the PDCCH/EPDCCH accompanied with the CIF in the other serving cell.

The mobile station device 1 which is set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The mobile station device 1 which is not set so that the mobile station device 1 monitors the PDCCH/EPDCCH accompanied with the CIF in correspondence with the serving cell in the other serving cell monitors the PDCCH/EPDCCH accompanied with the CIF or not accompanied with the CIF in the other serving cell.

The mobile station device 1 which is not set so that the mobile station device 1 monitors the PDCCH/EPDCCH accompanied with the CIF in correspondence with the serving cell in the other serving cell preferably receives the third information in regard to the serving cell via the PDCCH/EPDCCH in the other serving cell.

The PDCCH/EPDCCH in regard to the primary cell is transmitted in the primary cell. The third information in regard to the primary cell is preferably transmitted via the PDCCH/EPDCCH of the primary cell.

The base station device 3 transmits a parameter (cif-Presence-r10) indicating whether the CIF is included in the DCI format transmitted in the primary cell to the mobile station device 1.

The base station device 3 transmits a parameter (CrossCarrierSchedulingConfig-r10) related to cross carrier scheduling in each secondary cell to the mobile station device 1.

The parameter (CrossCarrierSchedulingConfig-r10) includes a parameter (schedulingCellInfo-r10) indicating whether the PDCCH/EPDCCH corresponding to a related secondary cell is transmitted in the secondary cell or the other serving cell.

When the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether the CIF is included in the DCI format transmitted in the secondary cell.

When the parameter (schedulingCellInfo-r10) indicates that the PDCCH/EPDCCH corresponding to a related secondary cell is transmitted in the other serving cell, the parameter (schedulingCellInfo-r10) includes a parameter (schedulingCellId) indicating a serving cell in which downlink allocation to the related secondary cell is transmitted.

Hereinafter, a method of setting the second downlink reference UL-DL configuration will be described.

When the plurality of serving cells are set in the mobile station device 1 and the first downlink reference UL-DL configuration is different between at least two serving cells, the mobile station device 1 and the base station device 3 set the second downlink reference UL-DL configuration. Unless the plurality of serving cells are set in the mobile station device 1 and the first downlink reference UL-DL configuration is different between at least two serving cells, the mobile station device 1 and the base station device 3 may not set the second downlink reference UL-DL configuration.

Cases other than the case in which the first downlink reference UL-DL configuration is different between at least two serving cells are cases in which the first downlink reference UL-DL configurations are the same in all of the serving cells. When one serving cell is set in the mobile station device 1, the mobile station device 1 and the base station device 3 may not set the second downlink reference UL-DL configuration.

Figure 13:
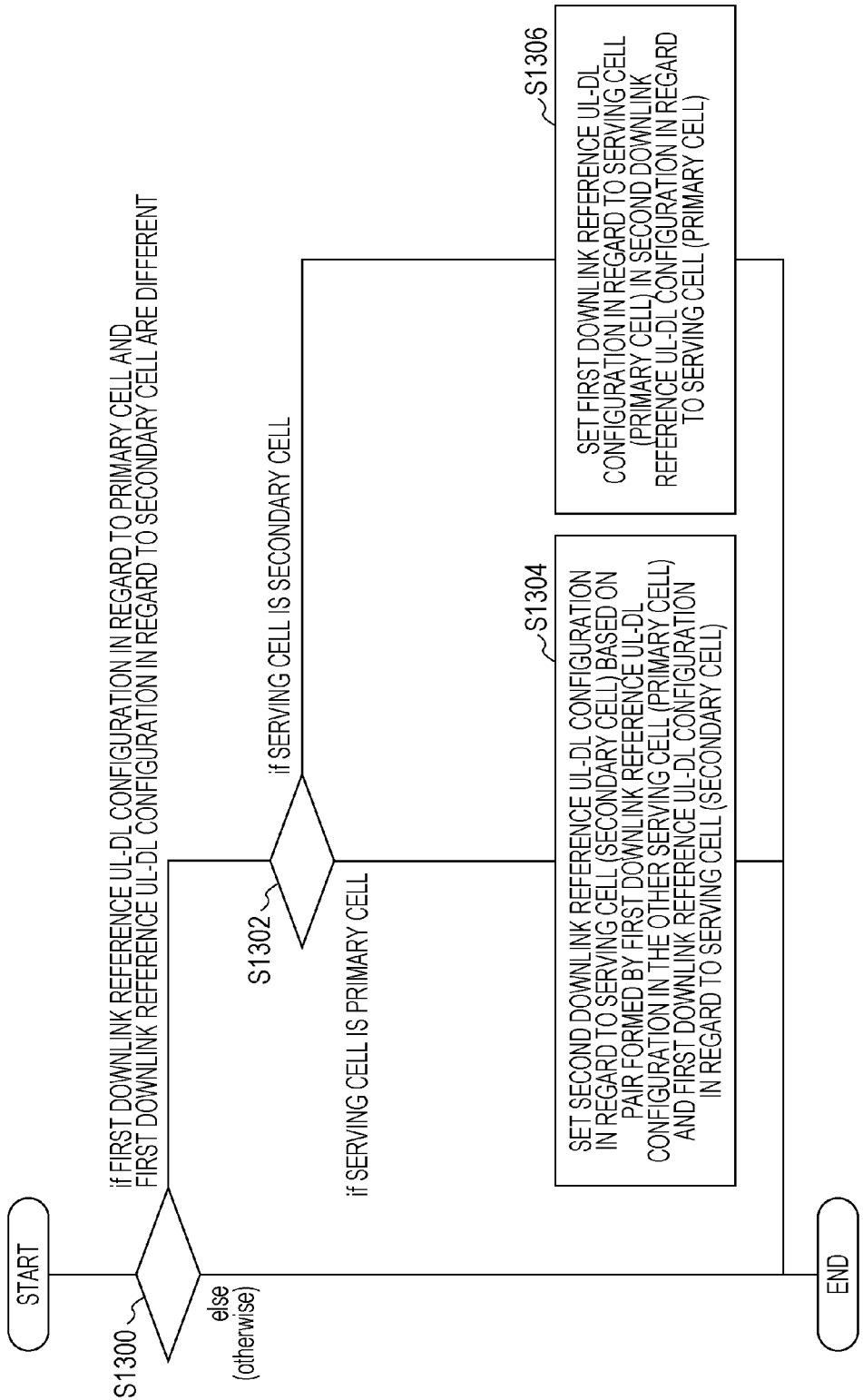
FIG. 13 is a flowchart illustrating a method of setting a second downlink reference UL-DL configuration according to the embodiment.

FIG. 13 is a flowchart illustrating the method of setting the second downlink reference UL-DL configuration according to the embodiment. In FIG. 13, one primary cell and one secondary cell are set in the mobile station device 1. The mobile station device 1 performs the setting method of FIG. 13 in regard to the primary cell and the secondary cell.

The mobile station device 1 determines whether the first downlink reference UL-DL configuration in regard to the primary cell and the first downlink reference UL-DL configuration in regard to the secondary cell are different (S1300). When the first downlink reference UL-DL configuration in regard to the primary cell and the first downlink reference UL-DL configuration in regard to the secondary cell are the same, the mobile station device 1 ends the process of setting the second downlink reference UL-DL configuration without setting the second downlink reference UL-DL configuration.

When the first downlink reference UL-DL configuration in regard to the primary cell and the first downlink reference UL-DL configuration in regard to the secondary cell are different, the mobile station device 1 determines whether the serving cell is the primary cell or the secondary cell (S1302).

When the serving cell is the secondary cell, the second uplink reference UL-DL configuration in regard to the serving cell (the secondary cell) is set based on a pair formed by the first downlink reference UL-DL configuration in regard to the other serving cell (the primary cell) and the first downlink reference UL-DL configuration in regard to the serving cell (the secondary cell) (S1304).

In S1304, the mobile station device 1 sets the second downlink reference UL-DL configuration in regard to the serving cell (the secondary cell) based on the table of FIG. 14. FIG. 14 is a diagram illustrating the pair formed by the first downlink reference UL-DL configuration in regard to the primary cell and the first downlink reference UL-DL configuration in regard to the secondary cell and correspondence of the second downlink reference UL-DL configuration in regard to the secondary cell according to the embodiment.

In FIG. 14, for the primary cell UL-DL configuration, the first downlink reference UL-DL configuration in regard to the primary cell is referred to. In FIG. 14, for the secondary cell UL-DL configuration, the first downlink reference UL-DL configuration in regard to the secondary cell is referred to.

The pair formed by the first downlink reference UL-DL configuration in regard to the primary cell and the first downlink reference UL-DL configuration in regard to the secondary cell belongs to set 1 of FIG. 14, the second downlink reference UL-DL configuration in regard to the secondary cell is defined in set 1.

When the mobile station device 1 is not set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 2 of FIG. 14, the second downlink reference UL-DL configuration in regard to the secondary cell is defined in set 2.

When the mobile station device 1 is not set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 3 of FIG. 14, the second downlink reference UL-DL configuration in regard to the secondary cell is defined in set 3.

When the mobile station device 1 is set so that the mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 4 of FIG. 14, the second downlink reference UL-DL configuration in regard to the secondary cell is defined in set 4.

When the mobile station device 1 is set so that mobile station device 1 monitors the PDCCH/EPDCCH accompanied with the CIF in correspondence with the secondary cell in the primary cell and the pair formed by the first downlink reference UL-DL configuration in regard to the primary cell and the first downlink reference UL-DL configuration in regard to the secondary cell belongs to set 5 of FIG. 14, the second downlink reference UL-DL configuration in regard to the secondary cell is defined in set 5.

For example, when first downlink reference UL-DL configuration 1 is set in regard to the primary cell and first downlink reference UL-DL configuration 0 is set in regard to the secondary cell, second downlink reference UL-DL configuration 1 is set in regard to the secondary cell.

When the serving cell is the primary cell, the first downlink reference UL-DL configuration in regard to the serving cell (the primary cell) is set in the second downlink reference UL-DL configuration in regard to the serving cell (primary cell) (S1306).

The base station device 3 also sets the second downlink reference UL-DL configuration based on the setting method of FIG. 13.

Hereinafter, the first uplink reference UL-DL configuration will be described.

The first uplink reference UL-DL configuration is used at least to specify the subframe with which the uplink transmission is possible or not possible in the serving cell.

The mobile station device 1 does not perform uplink transmission in the subframe instructed as the downlink subframe in accordance with the first uplink reference UL-DL configuration. The mobile station device 1 does not perform uplink transmission in the DwPTS and the GP of the subframe instructed as the special subframe in accordance with the first uplink reference UL-DL configuration.

Hereinafter, the first downlink reference UL-DL configuration will be described.

The first downlink reference UL-DL configuration is used at least to specify the subframe with which the downlink transmission is possible or not possible in the serving cell.

The mobile station device 1 does not perform downlink transmission in the subframe instructed as the uplink subframe in accordance with the first downlink reference UL-DL configuration. The mobile station device 1 does not perform downlink transmission in the UpPTS and the GP of the subframe instructed as the special subframe in accordance with the first downlink reference UL-DL configuration.

The mobile station device 1 in which the first downlink reference UL-DL configuration is set based on the first information may perform measurement (for example, measurement related to channel state information) using a downlink signal in the DwPTS of the special subframe or the downlink subframe instructed in accordance with the first uplink reference UL-DL configuration or the first downlink reference UL-DL configuration.

Accordingly, in the dynamic TDD, when the base station device 3 uses the subframe instructed as the downlink subframe in accordance with the first uplink reference UL-DL configuration as the special subframe or the uplink subframe or uses the subframe instructed as the special subframe in accordance with the first uplink reference UL-DL configuration as the uplink subframe, there is a problem that the mobile station device 1 in which the first downlink reference UL-DL configuration is set based on the first information may not appropriately perform the measurement using the downlink signal.

Therefore, the base station device 3 decides the downlink reference UL-DL configuration in a configuration set (configuration of a set) restricted based on the first uplink reference UL-DL configuration. That is, the first downlink reference UL-DL configuration is an element in the configuration set restricted based on the first uplink reference UL-DL configuration. The configuration set restricted based on the first uplink reference UL-DL configuration includes an uplink-downlink configuration satisfying the following conditions (a) to (c). FIG. 15 is a diagram illustrating a relation between the subframe instructed in accordance with the first uplink reference UL-DL configuration and the subframe instructed in accordance with the first downlink reference UL-DL configuration according to the embodiment. In FIG. 15, D denotes a downlink subframe, U denotes an uplink subframe, and S denotes a special subframe.

condition (a): The subframe instructed as the downlink subframe in accordance with the first uplink reference UL-DL configuration is instructed as the downlink subframe.

condition (b): The subframe instructed as the uplink subframe in accordance with the first uplink reference UL-DL configuration is instructed as the uplink subframe or the downlink subframe.

condition (c): The subframe instructed as the special subframe in accordance with the first uplink reference UL-DL configuration is instructed as the downlink subframe or the special subframe.

Thus, in the dynamic TDD, since the DwPTS of the special subframe and the subframe instructed as the downlink subframe in accordance with the first uplink reference UL-DL configuration are not used for uplink transmission, the mobile station device 1 in which the first downlink reference UL-DL configuration is set based on the first information can appropriately perform the measurement using the downlink signal.

The mobile station device 1 in which the first downlink reference UL-DL configuration is set based on the second information may also perform the measurement (for example, measurement related to channel state information) using a downlink signal in the DwPTS of the special subframe or the downlink subframe instructed in accordance with the first uplink reference UL-DL configuration.

A subframe instructed as the uplink subframe in accordance with the first uplink reference UL-DL configuration and instructed as the downlink subframe in accordance with the first downlink reference UL-DL configuration is also referred to as a first flexible subframe. The first flexible subframe is a subframe that is reserved for uplink and downlink transmission.

A subframe instructed as the special subframe in accordance with the first uplink reference UL-DL configuration and instructed as the downlink subframe in accordance with the first downlink reference UL-DL configuration is also referred to as a second flexible subframe. The second flexible subframe is a subframe that is reserved for downlink transmission. The second flexible subframe is a subframe that is reserved for downlink transmission in the DwPTS and uplink transmission in the UpPTS.

Hereinafter, the transmission direction UL-DL configuration will be described in detail.

When the mobile station device 1 decides a transmission direction (up/down) based on the first uplink reference UL-DL configuration, the first downlink reference UL-DL configuration, and the scheduling information (the DCI format and/or the HARQ-ACK), there is a problem that the mobile station device 1 erroneously receiving/decoding the scheduling information (the DCI format and/or the HARQ-ACK) in the subframe with which the base station device 3 transmits a downlink signal to another mobile station device 1 transmits an uplink signal, and thus the uplink signal interferes with the downlink signal.

Accordingly, the mobile station device 1 and the base station device 3 set the transmission direction UL-DL configuration related to the transmission direction (up/down) in the subframe. The transmission direction UL-DL configuration is used to decide the transmission direction in the subframe.

The mobile station device 1 controls the transmission in the first flexible subframe and the second flexible subframe based on the scheduling information (the DCI format and/or the HARQ-ACK) and the transmission direction UL-DL configuration.

The base station device 3 transmits the third information indicating the transmission direction UL-DL configuration to the mobile station device 1. The third information is information for giving an instruction of the subframe in which the uplink transmission is possible. The third information is information for giving an instruction of the subframe in which the downlink transmission is possible. The third information is information for giving an instruction of the subframe in which the uplink transmission is possible in the UpPTS and the downlink transmission is possible in the DwPTS.

For example, the transmission direction UL-DL configuration is used to specify a transmission direction in the subframe instructed as the uplink subframe in accordance with the first uplink reference UL-DL configuration and instructed as the downlink subframe in accordance with the first downlink reference UL-DL configuration and/or the subframe instructed as the special subframe in accordance with the first uplink reference UL-DL configuration and instructed as the downlink subframe in accordance with the first downlink reference UL-DL configuration. That is, the transmission direction UL-DL configuration is used to specify a transmission direction in the subframe instructed as a different subframe between the first uplink reference UL-DL configuration and the first downlink reference UL-DL configuration.

FIG. 16 is a diagram illustrating a relation among a subframe instructed in accordance with the first uplink reference UL-DL configuration, a subframe instructed in accordance with the first downlink reference UL-DL configuration, and a subframe instructed in accordance with a transmission direction UL-DL configuration according to the embodiment. In FIG. 16, D denotes a downlink subframe, U denotes an uplink subframe, and S denotes a special subframe.

The base station device 3 decides the transmission direction UL-DL configuration in the configuration set (configuration of a set) restricted based on the first uplink reference UL-DL configuration and the first downlink UL-DL configuration. That is, the transmission direction UL-DL configuration is an element in the configuration set restricted based on the first uplink reference UL-DL configuration and the first downlink reference UL-DL configuration. The configuration set restricted based on the first uplink reference UL-DL configuration and the first downlink reference UL-DL configuration includes an uplink-downlink configuration satisfying the following conditions (d) to (h).

condition (d): The subframe instructed as the downlink subframe in accordance with the first uplink reference UL-DL configuration and the first downlink reference UL-DL configuration is instructed as the downlink subframe.

condition (e): The subframe instructed as the uplink subframe in accordance with the first uplink reference UL-DL configuration and the first downlink reference UL-DL configuration is instructed as the uplink subframe.

condition (f): The subframe instructed as the uplink subframe in accordance with the first uplink reference UL-DL configuration and instructed as the downlink subframe in accordance with the first downlink reference UL-DL configuration is instructed as the uplink subframe or the downlink subframe.

condition (g): The subframe instructed as the special subframe in accordance with the first uplink reference UL-DL configuration and the first downlink reference UL-DL configuration is instructed as the special subframe.

condition (h): The subframe instructed as the special subframe in accordance with the first uplink reference UL-DL configuration and instructed as the downlink subframe in accordance with the first downlink reference UL-DL configuration is instructed as the special subframe or the downlink subframe.

The base station device 3 may schedule the downlink transmission in the subframe instructed as the downlink subframe in accordance with the transmission direction UL-DL configuration.

The mobile station device 1 may perform the process of receiving the downlink signal in the subframe instructed as the downlink subframe in accordance with the transmission direction UL-DL configuration. The mobile station device 1 may monitor the PDCCH/EPDCCH in the subframe instructed as the downlink subframe in accordance with the transmission direction UL-DL configuration. The mobile station device 1 may perform the process of receiving the PDSCH in the subframe instructed as the downlink subframe in accordance with the transmission direction UL-DL configuration based on detection of the downlink grant via the PDCCH/EPDCCH.

When the transmission of an uplink signal (PUSCH/SRS) is scheduled or set in the subframe instructed as the downlink subframe in accordance with the transmission direction UL-DL configuration, the mobile station device 1 does not perform the process of transmitting the uplink signal (the PUSCH/SRS) in the subframe.

The base station device 3 may schedule the uplink transmission in the subframe instructed as the uplink subframe in accordance with the transmission direction UL-DL configuration.

The base station device 3 may schedule the downlink transmission in the subframe instructed as the uplink subframe in accordance with the transmission direction UL-DL configuration. The scheduling of the downlink transmission by the base station device 3 may be prohibited in the subframe instructed as the uplink subframe in accordance with the transmission direction UL-DL configuration.

The mobile station device 1 may perform the process of transmitting an uplink signal in the subframe instructed as the uplink subframe in accordance with the transmission direction UL-DL configuration. When the transmission of an uplink signal (PUSCH/DMRS/SRS) is scheduled or set in the subframe instructed as the uplink subframe in accordance with the transmission direction UL-DL configuration, the mobile station device 1 may perform the process of transmitting the uplink signal (the PUSCH/DMRS/SRS) in the subframe.

The mobile station device 1 may perform the process of receiving a downlink signal in the subframe which is instructed as the uplink subframe in accordance with the transmission direction UL-DL configuration and in which the uplink transmission is not scheduled. The process of receiving the downlink signal by the mobile station device 1 may be prohibited in the subframe instructed as the uplink subframe in accordance with the transmission direction UL-DL configuration.

The base station device 3 may schedule the downlink transmission in the DwPTS of the subframe instructed as the special subframe in accordance with the transmission direction UL-DL configuration.

The mobile station device 1 may perform the process of receiving a downlink signal in the DwPTS of the subframe instructed as the special subframe in accordance with the transmission direction UL-DL configuration. The mobile station device 1 may monitor the PDCCH/EPDCCH in the DwPTS of the subframe instructed as the special subframe in accordance with the transmission direction UL-DL configuration. The mobile station device 1 may perform the process of receiving the PDSCH in the DwPTS of the subframe instructed as the special subframe in accordance with the transmission direction UL-DL configuration based on detection of the downlink grant via the PDCCH/EPDCCH.

When the transmission of the PUSCH in the subframe instructed as the special subframe is scheduled or set in accordance with the transmission direction UL-DL configuration, the mobile station device 1 does not perform the process of transmitting the PUSCH in the subframe.

When the transmission of the SRS in the UpPTS of the subframe instructed as the special subframe is scheduled or set in accordance with the transmission direction UL-DL configuration, the mobile station device 1 may perform the process of transmitting the SRS in the UpPTS of the subframe.

FIG. 17 is a diagram illustrating a relation among the first uplink reference UL-DL configuration, the first downlink reference UL-DL configuration, and the transmission direction UL-DL configuration according to the embodiment.

For example, when the first uplink reference UL-DL configuration is 0 in FIG. 17, the first downlink reference UL-DL configuration is one of a set {0, 1, 2, 3, 4, 5, 6}. For example, when the first uplink reference UL-DL configuration is 1 in FIG. 17, the first downlink reference UL-DL configuration is one of a set {1, 2, 4, 5}.

For example, when the first uplink reference UL-DL configuration is 0 and the first downlink reference UL-DL configuration is 1 in FIG. 17, the transmission direction UL-DL configuration is one of a set {0, 1, 6}.

A value of the first downlink reference UL-DL configuration may be the same as a value of the first uplink reference UL-DL configuration. However, the mobile station device 1 not receiving the second information sets the same value as the value of the first uplink reference UL-DL configuration as the first downlink reference UL-DL configuration. Therefore, it is preferable that the value of the first downlink reference UL-DL configuration indicated by the second information be not the same as the value of the first uplink reference UL-DL configuration indicated by the first information.

When the value of the first uplink reference UL-DL configuration is the same as the value of the first downlink reference UL-DL configuration, the transmission direction UL-DL configuration may not be defined. Alternatively, when the value of the first uplink reference UL-DL configuration is the same as the value of the first downlink reference UL-DL configuration, the same values as the value of the first uplink reference UL-DL configuration and the value of the first downlink reference UL-DL configuration may be set in the transmission direction UL-DL configuration.

A configuration set (configuration of a set) formed by the uplink-downlink configuration of the first uplink reference UL-DL configuration and the uplink-downlink configuration of the first downlink reference UL-DL configuration may be used as a configuration set restricted based on the first uplink reference UL-DL configuration and the first downlink reference UL-DL configuration.

For example, when the first uplink reference UL-DL configuration is 0 and the first downlink reference UL-DL configuration is 1, a configuration set restricted based on the first uplink reference UL-DL configuration and the first downlink reference UL-DL configuration is {0, 1}. In this case, the third information is preferably 1 bit.

The third information may be information indicating the transmission direction UL-DL configuration in the configuration set (configuration of a set) formed by the first uplink reference UL-DL configuration and the first downlink reference UL-DL configuration.

Hereinafter, the first uplink reference UL-DL configuration and the second uplink reference UL-DL configuration will be described in detail.

The first uplink reference UL-DL configuration and the second uplink reference UL-DL configuration are used to specify (select or decide) correspondence between subframe n in which the PDCCH/EPDCCH/PHICH is disposed and subframe n+k in which PUSCH corresponding to the PDCCH/EPDCCH/PHICH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to decide correspondence between the subframe in which the PDCCH/EPDCCH/PHICH is disposed and the subframe in which the PUSCH corresponding to the PDCCH/EPDCCH/PHICH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to decide correspondence between the subframe in which the PDCCH/EPDCCH/PHICH is disposed and the subframe in which the PUSCH corresponding to the PDCCH/EPDCCH/PHICH is disposed.

FIG. 18 is a diagram illustrating correspondence between subframe n in which PDCCH/EPDCCH/PHICH is disposed and subframe n+k in which a PUSCH corresponding to PDCCH/EPDCCH/PHICH is disposed according to the embodiment. The mobile station device 1 specifies (selects or decides) a value of k according to the table of FIG. 18.

When one primary cell is set or when one primary cell and one secondary cell are set and the first uplink reference UL-DL configuration in regard to the primary cell and the first uplink reference UL-DL configuration in regard to the secondary cell are the same in FIG. 18, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 18, the second uplink reference UL-DL configuration is referred to in the uplink-downlink configuration.

Hereinafter, in the description of FIG. 18, the first uplink reference UL-DL configuration and the second uplink reference UL-DL configuration are simply referred to as the uplink-downlink configuration.

When the PDCCH/EPDCCH accompanied with the uplink grant in which the mobile station device 1 is a target is detected in correspondence with the serving cell in which the uplink-downlink configurations 1 to 6 are set in subframe n, the mobile station device 1 performs the PUSCH transmission according to the uplink grant in subframe n+k specified (selected or decided) based on the table of FIG. 18.

When the PHICH accompanied with the NACK in which the mobile station device 1 is a target is detected in correspondence with the serving cell in which uplink-downlink configurations 1 to 6 are set in subframe n, the mobile station device 1 performs the PUSCH transmission in subframe n+k specified (selected or decided) based on the table of FIG. 18.

The uplink grant in which the mobile station device 1 is a target includes a 2-bit uplink index (UL index) in correspondence with the serving cell in which uplink-downlink configuration 0 is set. The uplink grant in which the mobile station device 1 is a target does not include an uplink index (UL index) in correspondence with the serving cell in which uplink-downlink configurations 1 to 6 are set.

When 1 is set in the Most Significant Bit (MSB) of the uplink index included in the uplink grant corresponding to the serving cell in which uplink-downlink configuration 0 is set in subframe n, the mobile station device 1 adjusts the PUSCH transmission according to the uplink grant in subframe n+k specified (selected or decided) based on the table of FIG. 18.

When the PHICH accompanied with the NACK corresponding to the serving cell in which uplink-downlink configuration 0 is set in the first resource set in subframe n=0 or 5 is received, the mobile station device 1 adjusts the PUSCH transmission according to the PHICH in subframe n+k specified (selected or decided) based on the table of FIG. 18.

When 1 is set in the Least Significant Bit (LSB) of the uplink index included in the uplink grant corresponding to the serving cell in which uplink-downlink configuration 0 is set in subframe n, the mobile station device 1 adjusts the PUSCH transmission according to the uplink grant in subframe n+7 specified (selected or decided).

When the PHICH accompanied with the NACK corresponding to the serving cell in which uplink-downlink configuration 0 is set in the second resource set in subframe n=0 or 5 is received, the mobile station device 1 adjusts the PUSCH transmission according to the uplink grant in subframe n+7.

When the PHICH accompanied with the NACK corresponding to the serving cell in which uplink-downlink configuration 0 is set in the second resource set in subframe n=1 or 6 is received, the mobile station device 1 adjusts the PUSCH transmission according to the uplink grant in subframe n+7.

For example, when the PDCCH/EPDCCH/PHICH corresponding to the serving cell in which uplink-downlink configuration 0 is set is detected in [SFN=m, subframe 1 ], the mobile station device 1 adjusts the PUSCH transmission in subframe [SFN=m, subframe 7] after 6 subframes.

The first uplink reference UL-DL configuration and the second uplink reference UL-DL configuration are used to specify (select or decide) correspondence between subframe n in which the PHICH is disposed and subframe n–k in which the PUSCH corresponding to the PHICH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to specify (select or decide) the correspondence between subframe n in which the PHICH is disposed and subframe n–k in which the PUSCH corresponding to the PHICH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to specify (select or decide) the correspondence between subframe n in which the PHICH is disposed and subframe n–k in which the PUSCH corresponding to the PHICH is disposed.

FIG. 19 is a diagram illustrating the correspondence between subframe n in which the PHICH is disposed and subframe n–k in which the PUSCH corresponding to the PHICH is disposed according to the embodiment. The mobile station device 1 specifies (selects or decides) a value of k in accordance with the table of FIG. 19.

When one primary cell is set in FIG. 19 or when one primary cell and one secondary cell are set and the first uplink reference UL-DL configuration in regard to the primary cell and the first uplink reference UL-DL configuration in regard to the secondary cell are the same in FIG. 19, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 19, the second uplink reference UL-DL configuration is referred to in the uplink-downlink configuration.

Hereinafter, in the description of FIG. 19, the first uplink reference UL-DL configuration and the second uplink reference UL-DL configuration are simply referred to as the uplink-downlink configuration.

For a serving cell in which uplink-downlink configurations 1 to 6 are set, the HARQ indicator (HARQ-ACK) received via the PHICH corresponding to the serving cell in subframe n is related to the PUSCH transmission in subframe n–k specified based on the table of FIG. 19.

For a serving cell in which uplink-downlink configuration 0 is set, the HARQ indicator (HARQ-ACK) received via the PHICH corresponding to the serving cell in the first resource set of subframe n=0 or 5 or in subframe n=1 or 6 is related to the PUSCH transmission in subframe n–k specified based on the table of FIG. 19.

For a serving cell in which uplink-downlink configuration 0 is set, the HARQ indicator (HARQ-ACK) received via the PHICH corresponding to the serving cell in the second resource set of subframe n=0 or 5 is related to the PUSCH transmission in subframe n–6.

For example, for a serving cell in which uplink-downlink configuration 1 is set, the HARQ indicator (HARQ-ACK) received via the PHICH in [SFN=m, subframe 1] is related to the PUSCH transmission in subframe [SFN=m–1, subframe 7] before 4 subframes.

The first uplink reference UL-DL configuration and the second uplink reference UL-DL configuration are used to specify (select or decide) the correspondence between subframe n in which the PUSCH is disposed and subframe n+k in which the PHICH corresponding to the PUSCH is disposed.

When one primary cell is set or when one primary cell and one secondary cell are set and the first uplink reference UL-DL configuration in regard to the primary cell and the first uplink reference UL-DL configuration in regard to the secondary cell are the same, the corresponding first uplink reference UL-DL configuration is used in each of two serving cells to specify (select or decide) the correspondence between subframe n in which the PUSCH is disposed and subframe n+k in which the PHICH corresponding to the PUSCH is disposed.

When one primary cell and one secondary cell are set and the first uplink reference UL-DL configuration in regard to the primary cell and the first uplink reference UL-DL configuration in regard to the secondary cell are different, the corresponding second uplink reference UL-DL configuration is used in each of two serving cells to specify (select or decide) the correspondence between subframe n in which the PUSCH is disposed and subframe n+k in which the PHICH corresponding to the PUSCH is disposed.

FIG. 20 is a diagram illustrating correspondence between subframe n in which a PUSCH is disposed and subframe n+k in which a PHICH corresponding to the PUSCH is disposed according to the embodiment. The mobile station device 1 specifies (selects or decides) a value of k in accordance with the table of FIG. 20.

When one primary cell is set or when one primary cell and one secondary cell are set and the first uplink reference UL-DL configuration in regard to the primary cell and the first uplink reference UL-DL configuration in regard to the secondary cell are the same in FIG. 20, the first uplink reference UL-DL configuration is referred to in the uplink-downlink configuration.

When one primary cell and one secondary cell are set and the first uplink reference UL-DL configuration in regard to the primary cell and the first uplink reference UL-DL configuration in regard to the secondary cell are different in FIG. 20, the second uplink reference UL-DL configuration is referred to in the uplink-downlink configuration.

Hereinafter, in the description of FIG. 20, the first uplink reference UL-DL configuration and the second uplink reference UL-DL configuration are simply referred to as the uplink-downlink configuration.

When the PUSCH transmission in subframe n is scheduled, the mobile station device 1 decides the PHICH resources in subframe n+k specified from the table of FIG. 20.

For example, when the PUSCH transmission in [SFN=m, subframe n=2] to the serving cell in which uplink-downlink configuration 0 is set is scheduled, the PHICH resources in [SFN=m, subframe n=6] are decided.

For example, when the PUSCH transmission in [SFN=m, subframe n=3] to the serving cell in which uplink-downlink configuration 0 is set is scheduled, the PHICH resources in the first resource set of [SFN=m+1, subframe n=0] are decided.

For example, when the PUSCH transmission in [SFN=m, subframe n=4] to the serving cell in which uplink-downlink configuration 0 is set is scheduled, the PHICH resources in the second resource set of [SFN=m+1, subframe n=0] are decided.

For example, when the PUSCH transmission in [SFN=m, subframe n=7] to the serving cell in which uplink-downlink configuration 0 is set is scheduled, the PHICH resources in [SFN=m+1, subframe n=1] are decided.

For example, when the PUSCH transmission in [SFN=m, subframe n=8] to the serving cell in which uplink-downlink configuration 0 is set is scheduled, the PHICH resources in the first resource set of [SFN=m+1, subframe n=5] are decided.

For example, when the PUSCH transmission in [SFN=m, subframe n=9] to the serving cell in which uplink-downlink configuration 0 is set is scheduled, the PHICH resources in the second resource set of [SFN=m+1, subframe n=5] are decided.

Hereinafter, the first downlink reference UL-DL configuration and the second downlink reference UL-DL configuration will be described in detail.

The first downlink reference UL-DL configuration and the second downlink reference UL-DL configuration are used to specify (select or decide) the correspondence between subframe n in which the PDSCH is disposed and subframe n+k with which the HARQ-ACK corresponding to the PDSCH is transmitted.

When one primary cell is set or when one primary cell and one secondary cell are set and the first downlink reference UL-DL configuration in regard to the primary cell and the first downlink reference UL-DL configuration in regard to the secondary cell are the same, the corresponding first downlink reference UL-DL configuration is used in each of two serving cells to specify (select or decide) the correspondence between subframe n in which the PDSCH is disposed and subframe n+k with which the HARQ-ACK corresponding to the PDSCH is transmitted.

When one primary cell and one secondary cell are set and the first downlink reference UL-DL configuration in regard to the primary cell and the first downlink reference UL-DL configuration in regard to the secondary cell are different, the corresponding second downlink reference UL-DL configuration is used in each of two serving cells to specify (select or decide) the correspondence between subframe n in which the PDSCH is disposed and subframe n+k with which the HARQ-ACK corresponding to the PDSCH is transmitted.

FIG. 21 is a diagram illustrating correspondence between subframe n−k in which a PDSCH is disposed and subframe n in which an HARQ-ACK corresponding to the PDSCH is transmitted according to the embodiment. The mobile station device 1 specifies (selects or decides) the value of k according to the table of FIG. 21.

When one primary cell is set or when one primary cell and one secondary cell are set and the first downlink reference UL-DL configuration in regard to the primary cell and the first downlink reference UL-DL configuration in regard to the secondary cell are the same in FIG. 21, the first downlink reference UL-DL configuration is referred to in the uplink-downlink configuration.

When one primary cell and one secondary cell are set and the first downlink reference UL-DL configuration in regard to the primary cell and the first downlink reference UL-DL configuration in regard to the secondary cell are different in FIG. 21, the second downlink reference UL-DL configuration is referred to in the uplink-downlink configuration.

Hereinafter, in the description of FIG. 21, the first downlink reference UL-DL configuration and the second downlink reference UL-DL configuration are simply referred to as the uplink-downlink configuration.

When PDSCH transmission in which the mobile station device 1 is a target and the corresponding HARQ-ACK is to be transmitted in subframe n−k (where k is specified in accordance with the table of FIG. 21) of the serving cell, the mobile station device 1 transmits the HARQ-ACK in subframe n.

For example, the mobile station device 1 does not respond to the HARQ-ACK for the PDSCH transmission used to transmit system information. For example, the mobile station device 1 responds to the HARQ-ACK to the PDSCH transmission scheduled in accordance with the DCI format accompanied with the CRC scrambled with the C-RNTI.

For example, the mobile station device 1 transmits the HARQ-ACK for the PDSCH received in subframe n−6 and/or n−7 in the serving cell in which uplink-downlink configuration 1 is set in subframe n=2.

When the first uplink reference UL-DL configuration is set and the first downlink reference UL-DL configuration and the transmission direction UL-DL configuration are not set, the mobile station device 1 may specify (select or decide) a transmission direction (up/down) based on the first uplink reference UL-DL configuration.

When the first uplink reference UL-DL configuration and the first downlink reference UL-DL configuration are set and the transmission direction UL-DL configuration is not set, the mobile station device 1 may specify (select or decide) a transmission direction (up/down) based on the first downlink reference UL-DL configuration.

In the serving cell in which the second information is not received, the first downlink reference UL-DL configuration may not be defined. In this case, the mobile station device 1 and the base station device 3 may perform a process to be performed based on the above-described first downlink reference UL-DL configuration based on the first uplink reference UL-DL configuration (serving cell UL-DL configuration). The serving cell in which the second information is not received is a serving cell in which the dynamic TDD is not set.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, and the serving cell is the secondary cell, the second downlink reference UL-DL configuration in regard to the serving cell (the secondary cell) may be set based on the pair formed by the first uplink reference UL-DL configuration in regard to the other serving cell (the primary cell) and the first downlink reference UL-DL configuration in regard to the serving cell (the secondary cell).

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, the corresponding second downlink reference UL-DL configuration may be used in each of two serving cells to specify (select or decide) the correspondence between subframe n in which the PDSCH is disposed and subframe n+k with which the HARQ-ACK corresponding to the PDSCH is transmitted.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are the same, the serving cell is the secondary cell, the corresponding first uplink reference UL-DL configuration (serving cell UL-DL configuration) may be used in the primary cell to specify (select or decide) the correspondence between subframe n in which the PDSCH is disposed and subframe n+k with which the HARQ-ACK corresponding to the PDSCH is transmitted and the corresponding first downlink reference UL-DL configuration may be used in the secondary cell to specify (select or decide) the correspondence between subframe n in which the PDSCH is disposed and subframe n+k with which the HARQ-ACK corresponding to the PDSCH is transmitted.

For example, when one primary cell and one secondary cell are set, the second information in regard to the primary cell is not received, the second information in regard to the secondary cell is received, and the first uplink reference UL-DL configuration (serving cell UL-DL configuration) in regard to the primary cell and the first downlink reference UL-DL configuration in regard to the secondary cell are different, the first uplink reference UL-DL configuration in regard to the primary cell is referred to in the primary cell UL-DL configuration in FIGS. 12 and 14.

Hereinafter, Discontinuous Reception (DRX) according to the present invention will be described.

DRX functionality is set by a higher layer (RRC) and is processed by a MAC. The DRX functionality controls a PDCCH monitoring activity of the mobile station device 1 in regard to the C-RNTI and the SPS C-RNTI of the mobile station device 1.

That is, the DRX functionality controls a monitoring activity of the mobile station device 1 in the PDCCH used to transmit the DCI format to which the CRC parity bit scrambled with the C-RNTI or the SPS C-RNTI of the mobile station device 1 is added.

The DRX functionality described herein does not control a monitoring activity of the third information transmitted using the C-RNTI. The monitoring activity of the third information will be described below.

When the DRX is set at the time of RCC_CONNECTED, the mobile station device 1 may discontinuously monitors the PDCCH using a DRX operation to be described below. In other cases, the mobile station device 1 may continuously monitor the PDCCH.

The DRX operation is common to the plurality of serving cells.

A higher layer (RRC) controls the DRX operation by setting the following plurality of timers and value of drx-StartOffset. The higher layer (RRC) may optionally set or may not optionally set drxShortCycleTimer and shortDRX-Cycle.

onDurationTimer
    drx-InactivityTimer
    drx-RetransmissionTimer (one for each downlink HARQ process excluding a downlink HARQ process for a broadcast process)
    longDRX-Cycle
    drxShortCycleTimer (optional)
    shortDRX-Cycle (optional)

The base station device 3 may transmit an RRC message including parameter/information indicating values of onDurationTimer, drx-InactivityTimer, drx-RetransmissionTimer, longDRX-Cycle, drxShortCycleTimer, shortDRX-Cycle, and drxStartOffset to the mobile station device 1.

The mobile station device 1 may set the values of onDurationTimer, drx-InactivityTimer, drx-RetransmissionTimer, longDRX-Cycle, drxShortCycleTimer, shortDRX-Cycle, and drxStartOffset based on the received RRC message.

Further, longDRX-Cycle and shortDRX-Cycle are also collectively referred to DRC cycles.

onDurationTimer indicates the number of PDCCH subframes continuous from the beginning of the DRX cycle.

onDurationTimer related to a long DRX cycle may indicate the number of subframes instructed as the downlink subframes in accordance with the first uplink reference UL-DL configuration and the first downlink reference UL-DL configuration continuous from the beginning of the long DRX cycle and subframes instructed as the special subframes in accordance with the first uplink reference UL-DL configuration and the first downlink reference UL-DL configuration. onDurationTimer related to a short DRX may indicate the number of PDCCH subframes continuous from the beginning of the DRX cycle.

Drx-InactivityTimer indicates the number of PDCCH subframes continuous after the subframe to which the PDCCH giving an instruction of initial transmission of the uplink data or the downlink data to the mobile station device 1 is mapped.

Drx-RetransmissionTimer indicates the maximum number of PDCCH subframes continuous for downlink retransmission expected by the mobile station device 1. The same value of drx-RetransmissionTimer is applied to all of the serving cells.

The DRX cycle indicates an on-duration repetition periodicity. After an on-duration period, a period in which PDCCH monitoring inactivity of the mobile station device 1 in the C-RNTI and the SPS C-RNTI of the mobile station device 1 is possible continues.

Figure 22:
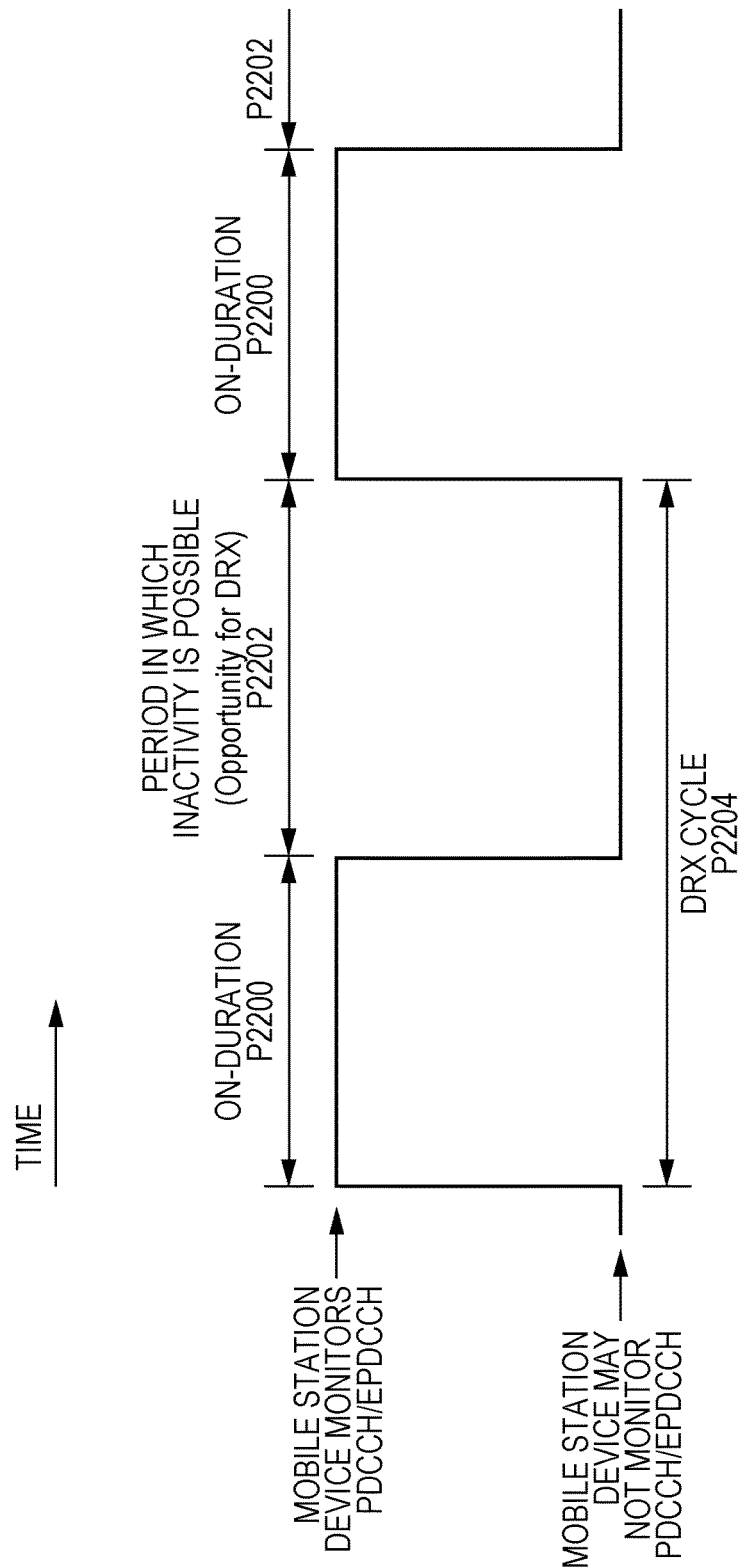
FIG. 22 is a diagram illustrating an example of a DRX cycle according to the embodiment.

FIG. 22 is a diagram illustrating an example of a DRX cycle according to the embodiment. In FIG. 22, the horizontal axis is a time axis. In FIG. 22, the mobile station device 1 monitors the PDCCH/EPDCCH during an on-duration periodicity P2200. In FIG. 22, a periodicity P2202 after the on-duration period P2200 is a period in which inactivity is possible. That is, in FIG. 22, the mobile station device 1 may not monitor the PDCCH/EPDCCH during the period P2202.

drxShortCycleTimer indicates the number of subframes continuous according to the short DRX cycle by the mobile station device 1.

drxStartOffset indicates a subframe in which the DRX cycle starts.

An HARQ Round Trip Time (RTT) timer is managed for each downlink HARQ process in relation to the start of drx-RetransmissionTimer. The HARQ RTT timer indicates a minimum interval from transmission of downlink data to retransmission of the downlink data. That is, the HARQ RTT timer indicates a minimum amount of subframes before downlink HARQ retransmission is expected by the mobile station device 1.

In the case of a TDD, the HARQ RTT timer is set in k+4 subframe, and k is an interval during HARQ feedback related to downlink transmission and the downlink transmission and is specified (selected or decided) according to the table of FIG. 21.

In the embodiment, one downlink HARQ process controls HARQ of one piece of downlink data (transport block). One downlink HARQ process may control two pieces of downlink data.

When the DRX cycle is set, an active time includes a period in which at least one of the following conditions (i) to (l) is satisfied.

condition (i): onDurationTimer, drx-InactivityTimer, drx-RetransmissionTimer, or mac-ContentionResolution-Timer is running condition (j): A scheduling request is transmitted with the PUCCH and is pending.

condition (k): An uplink grant for the pending HARQ retransmission is likely to be transmitted and data is present in a corresponding HARQ buffer.

condition (l): After reception of a random access response to a preamble not selected by the mobile station device 1 is successful, the C-RNTI of the mobile station device 1 is not present and the PDCCH giving an instruction of initial transmission has not been received.

Once a timer starts, the timer is running until the timer stops or expires. In the other cases, the timer does not run. When the timer does not run, there is a possibility of the timer starting. When the timer is running, there is a possibility of the timer restarting. The timer normally starts or restarts from an initial value of the timer.

The preamble is message 1 of a random access procedure and is transmitted with the PRACH. The preamble not selected by the mobile station device 1 is related to a contention-based random access procedure.

A random access response is message 2 of the random access procedure and is transmitted with the PDSCH. The base station device 3 transmits the random access response to the received preamble.

The mobile station device 1 during execution of the contention-based random access procedure transmits message 3 after the reception of the random access response. The mobile station device 1 monitors the PDCCH/EPDCCH related to message 4 after the transmission of message 3.

mac-ContentionResolutionTimer indicates the number of continuous subframes in which the mobile station device 1 monitors the PDCCH/EPDCCH after the transmission of message 3.

The same active time is applied to all of the activated serving cells. The primary cell is normally activated. The secondary cell is activated or deactivated by the MAC. The base station device 3 transmits the MAC CE giving an instruction to activate or deactivate the secondary cell to the mobile station device 1.

The mobile station device 1 may not monitor the PDCCH/EPDCCH in the deactivated serving cell. The mobile station device 1 may not monitor the PDCCH/EPDCCH in regard to the deactivated serving cell.

Figure 23:
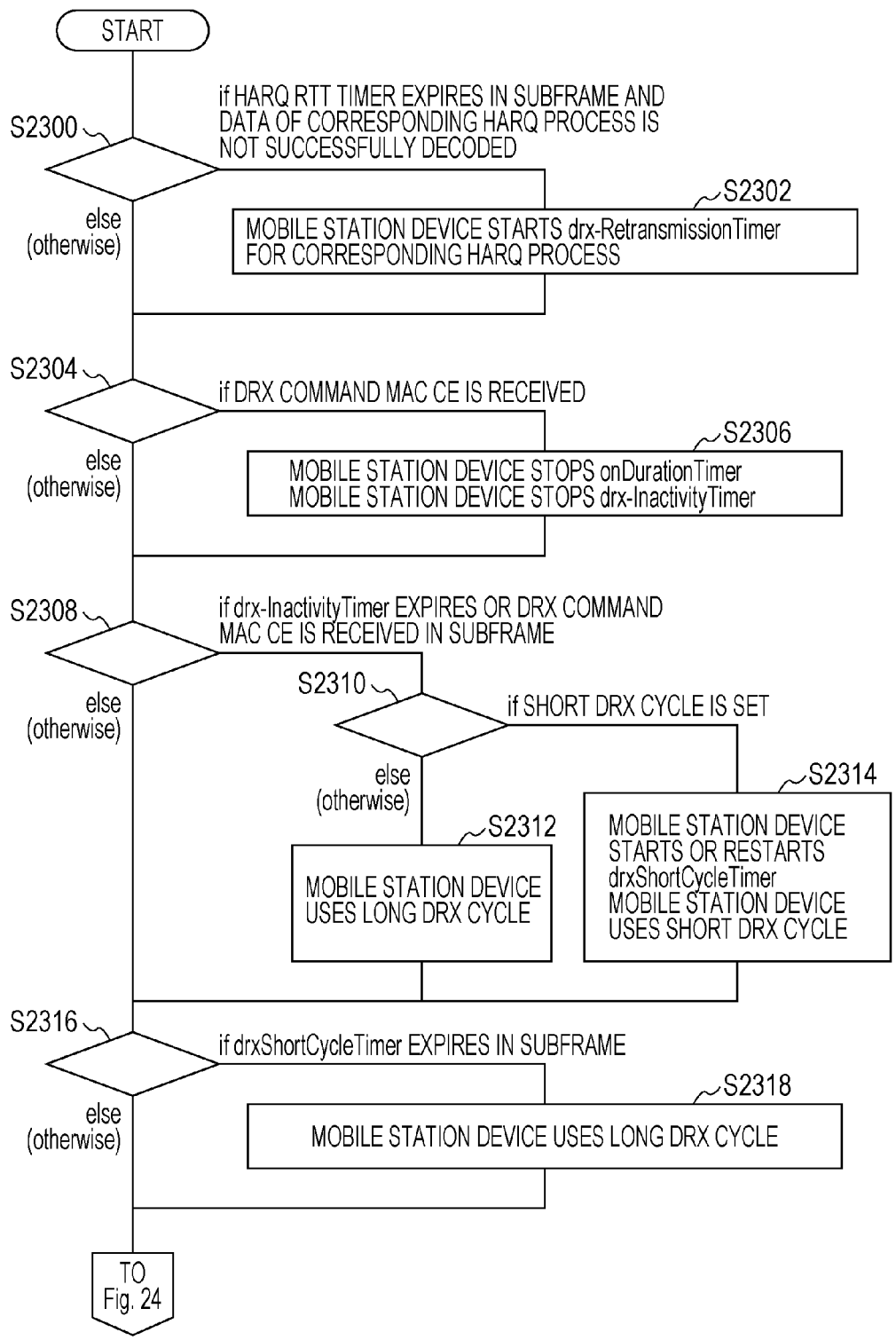
FIG. 23 is a flowchart illustrating an example of a DRX operation according to the embodiment.

FIGS. 23 and 24 are flowcharts illustrating an example of a DRX operation according to the embodiment. When the DRX is set, the mobile station device 1 performs the DRX operation in each subframe based on the flowcharts of FIGS. 23 and 24.

When the HARQ RTT timer expires in the subframe and the mobile station device 1 does not decode data of the HARQ process corresponding to the HARQ RTT timer successfully (S2300), the mobile station device 1 starts drx-RetransmissionTimer for the HARQ process corresponding to the HARQ RTT timer (S2302). Then, the process proceeds to S2304. Otherwise (S2300), the mobile station device 1 allows the process to proceed to S2304.

When a DRX command MAC CE is received (S2304), the mobile station device 1 stops onDurationTimer and drx-InactivityTimer (S2306). Then, the process proceeds to S2308. Otherwise (S2304), the mobile station device 1 allows the process to proceed to S2308.

When drx-InactivityTimer expires or the DRX command MAC CE is received in the subframe (S2308), the mobile station device 1 allows the process to proceed to S2310. Otherwise (S2308), the mobile station device 1 allows the process to proceed to S2316.

When the short DRX cycle (shortDrX-Cycle) is not set (S2310), the mobile station device 1 uses the long DRX cycle (S2312). Then, the process proceeds to S2316. When the short DRX cycle (shortDRX-Cycle) is set (S2310), the mobile station device 1 starts or restarts drxShortCycleTimer and uses the short DRX cycle (S2312). Then, the process proceeds to S2316.

When drxShortCycleTimer expires in the subframe (S2316), the mobile station device 1 uses the long DRX cycle (S2318). Then, the process proceeds to S2400 of FIG. 24. Otherwise (S2316), the mobile station device 1 allows the process to proceed to S2400 of FIG. 24.

When (1) the short DRX cycle is used and [(SFN*10)+subframe number] modulo (shortDRX-Cycle)=(drxStartOffset) modulo (shortDRX-Cycle) or (2) the long DRX cycle is used and [(SFN*10)+subframe number] modulo (longDRX-Cycle)=drxStartOffset (S2400), the mobile station device 1 starts onDurationTimer (S2402). Then, the process proceeds to S2404. Otherwise (S2400), the mobile station device 1 allows the process to proceed to S2404.

When all of the following conditions (m) to (q) are satisfied (S2404), the mobile station device 1 monitors the PDCCH/EPDCCH in the subframe (S2406). Then, the process proceeds to S2408.

condition (m): The subframe is included in a period of the active time.

condition (n): The subframe is a PDCCH subframe.

condition (o): The subframe is not necessary for the uplink transmission to the mobile station device 1 of a half-duplex FDD operation.

condition (p): The subframe is not the first flexible subframe necessary to transmit the uplink signal (the PUSCH or the PUCCH) to the mobile station device 1 of the dynamic TDD operation.

condition (q): The subframe is not part of a set measurement gap.

The condition (p) includes the fact that the subframe is not the first flexible subframe in which the transmission of the PUSCH and/or the PUCCH is scheduled and/or set.

In the half-duplex FDD serving cell, the mobile station device 1 cannot simultaneously perform uplink transmission and downlink reception. The mobile station device 1 may transmit, to the base station device 3, information indicating whether the half-duplex FDD in an FDD band is supported.

The measurement gap is a time interval at which the mobile station device 1 measures cells of different frequencies and/or different Radio Access Technologies (RATs). The base station device 3 transmits information indicating a period of the measurement gap to the mobile station device 1. The mobile station device 1 sets the period of the measurement gap based on the information.

When at least one of the conditions (m) to (q) is not satisfied (S2404), the mobile station device 1 ends the DRX operation of the subframe. That is, when at least one of the conditions (m) to (q) is not satisfied, the mobile station device 1 may not monitor the PDCCH/EPDCCH of the subframe.

The conditions used in S2404 are not limited to the conditions (m) to (q), but conditions different from the conditions (m) to (q) may be used in S2404 or some of the conditions (m) to (q) may be used.

When an instruction of the downlink transmission is given by the downlink assignment received via the PDCCH/EPDCCH or when the downlink assignment is set in the subframe (S2408), the mobile station device 1 starts the HARQ RTT timer for the corresponding HARQ process and stops drx-RetransmissionTimer for the corresponding HARQ process (S2410). Otherwise (S2408), the mobile station device 1 allows the process to proceed to S2412.

The state in which the downlink assignment is set means a state in which semi-persistent scheduling is activated by the downlink assignment accompanied with the SPS C-RNTI.

When the downlink assignment received via the PDCCH/EPDCCH gives an instruction of downlink or uplink initial transmission (S2412), the mobile station device 1 starts or restarts drx-InactivityTimer (S2414) and ends the DRX operation on the subframe. Otherwise (S2412), the mobile station device 1 ends the DRX operation on the subframe.

The mobile station device 1 in which the DRX is set does not transmit the periodic SRS when the period is not the active time.

The base station device 3 may transmit information used to instruct the mobile station device 1 to set up or release CQI masking to the mobile station device 1.

The mobile station device 1 in which the DRX is set and the CQI masking (cqi-Mask) is not set up by a higher layer does not transmit the CSI via the PUCCH when the period is not the active time. The mobile station device 1 in which the DRX is set and the CQI masking (cqi-Mask) is set up by the higher layer does not transmit the CSI via the PUCCH when onDurationTimer is not running When the long DRX cycle or the short DRX cycle is used, longDRX-Cycle, shortDRX-Cycle, and drxStartOffset are preferably set so that onDurationTimer starts in the subframe instructed as the downlink subframe in accordance with the first uplink reference UL-DL configuration and the first downlink reference UL-DL configuration or the subframe instructed as the special subframe in accordance with the first uplink reference UL-DL configuration and the first downlink reference UL-DL configuration.

When the short DRX cycle is used, longDRX-Cycle and drxStartOffset may be set so that onDurationTimer starts in the flexible subframe.

Hereinafter, the PDCCH subframe according to the present invention will be described.

In the embodiment, the mobile station device 1 and the base station device 3 specify the PDCCH subframe based on the first downlink reference UL-DL configuration.

In the embodiment, the base station device 3 and the mobile station device 1 communicating with the base station device 3 using one primary cell specify (select or decide) the subframe instructed as the downlink subframe or the subframe including the DwPTS as the PDCCH subframe in accordance with the first downlink reference UL-DL configuration corresponding to the primary cell in the case of the half-duplex TDD.

When the TDD operation is performed using one primary cell, the mobile station device 1 cannot simultaneously perform transmission and reception. That is, a TDD operation performed using only one primary cell is a half-duplex TDD.

In the embodiment, the base station device 3 and the mobile station device 1 communicating with the base station device 3 using a plurality of serving cells including one primary cell and one secondary cell or a plurality of secondary cells specify the subframe instructed as the downlink subframe or the subframe including the DwPTS as the PDCCH subframe in accordance with the first downlink reference UL-DL configuration corresponding to the primary cell in the case of the half-duplex TDD.

In the embodiment, when the parameter (schedulingCellId) indicating a serving cell with which the downlink assignment to the related secondary cell is transmitted is set in the secondary cell, the base station device 3 and the mobile station device 1 communicating with the base station device 3 using a plurality of serving cells including one primary cell and one secondary cell or a plurality of secondary cells specify a union of the subframes instructed as the downlink subframes or the subframes including the DwPTS as the PDCCH subframes in accordance with the first downlink reference UL-DL configuration corresponding to the plurality of serving cells excluding the secondary cell in which the parameter (schedulingCellId) is set in the case of the full-duplex TDD.

When the parameter (schedulingCellId) indicating a serving cell with which the downlink assignment to the related secondary cell is transmitted is not set in the secondary cell, a process of excluding the secondary cell in which the parameter (schedulingCellId) is set may not be performed.

Figures 27, 28:
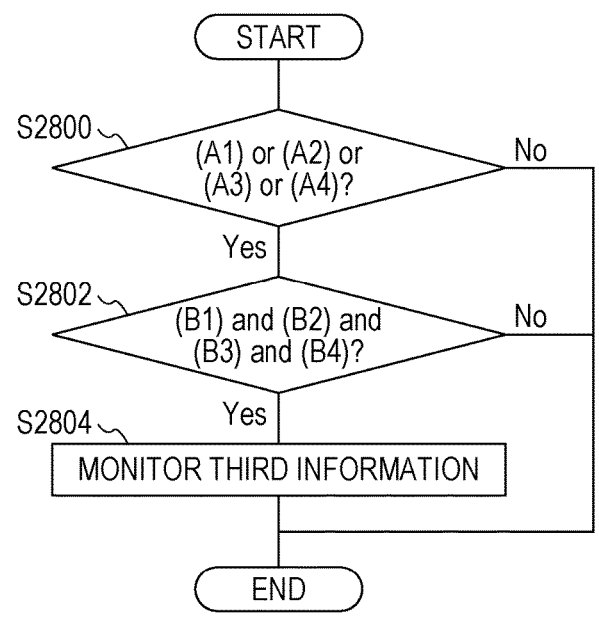
FIG. 27 is a diagram illustrating examples of PDCCH subframes according to the embodiment.
FIG. 28 is a flowchart illustrating monitoring of third information according to the embodiment.

FIGS. 25, 26, and 27 are diagrams illustrating examples of the PDCCH subframes according to the embodiment. In FIGS. 25, 26, and 27, D denotes a downlink subframe, U denotes an uplink subframe, S denotes a special subframe, and P denotes a PDCCH subframe.

In FIG. 25, one primary cell is set and no secondary cell is set in the mobile station device 1. In FIGS. 26 and 27, one primary cell is set and one secondary cell is set in the mobile station device 1. In FIGS. 26 and 27, the PDCCH/EPDCCH corresponding to the one secondary cell is transmitted with the secondary cell.

In FIGS. 25 and 26, the mobile station device 1 performs the half-duplex TDD operation. In FIG. 27, the mobile station device 1 performs the full-duplex TDD operation.

In FIGS. 25 and 26, the mobile station device 1 and the base station device 3 specify subframes {0, 1, 5, 6, 7, 8, 9} instructed as the downlink subframes or the subframes including the DwPTS as the PDCCH subframes in accordance with first downlink reference UL-DL configuration 3 in regard to the primary cell.

In FIG. 27, the mobile station device 1 and the base station device 3 specify a union of subframes {0, 1, 3, 4, 5, 6, 7, 8, 9} instructed as the downlink subframes or the subframes including the DwPTS as the PDCCH subframes in accordance with first downlink reference UL-DL configuration 3 in regard to the primary cell and first downlink reference UL-DL configuration 2 in regard to the secondary cell.

In the embodiment, when a plurality of serving cells are set in the mobile station device 1 and the first downlink reference UL-DL configuration is different between at least two serving cells, the PDCCH subframes may be specified based on the second downlink reference UL-DL configuration instead of the first downlink reference UL-DL configuration.

In the embodiment, the PDCCH subframes may be specified excluding the subframes necessary to transmit uplink signals (the PUSCH, the PUCCH, and/or the aperiodic SRS) to the mobile station device 1 of the dynamic TDD operation. That is, the PDCCH subframes may be specified excluding the first flexible subframe in which the PUSCH and/or PUCCH transmission is scheduled and/or set.

Hereinafter, the monitoring of the third information according to the embodiment will be described.

When the mobile station device 1 normally monitors the third information in the serving cell in which the dynamic TDD is set, there is a problem that power consumption increases.

Accordingly, in the embodiment, the mobile station device 1 controls the monitoring of the PDCCH used to transmit the DCI format to which the CRC parity bit scrambled with the C-RNTI is added based on the active time related to the DRX operation and controls the monitoring of the third information based on the active time related to the DRX operation and based on whether the HARQ RTT timer related to the downlink HARQ retransmission is running Further, the mobile station device 1 may control the monitoring of the third information based on whether there is a possibility of the transmission of the PUSCH and/or the aperiodic SRS being scheduled and whether the transmission of the PUSCH and/or the aperiodic SRS is pending.

The monitoring of the third information may be controlled by the DRX control unit 1017.

When data (transport block) is stored in an uplink HARQ buffer, the mobile station device 1 considers that there is a possibility of the uplink grant to the data being received and the transmission of the PUSCH and/or the aperiodic SRS being scheduled in accordance with the uplink grant.

When data (transport block) is stored in the uplink HARQ buffer and the uplink grant to the data is stored, the mobile station device 1 may consider that there is a possibility of the uplink grant to the data being received and the transmission of the PUSCH and/or the aperiodic SRS being scheduled in accordance with the uplink grant.

When data (transport block) is stored in the uplink HARQ buffer, the mobile station device 1 considers the HARQ retransmission of the data to be pending.

When the transmission of the PUSCH or the aperiodic SRS is scheduled in accordance with the DCI format, the mobile station device 1 considers the transmission of the PUSCH or the aperiodic SRS to be pending up to the subframe (timing) with which the PUSCH or the aperiodic SRS is to be transmitted.

The monitoring of the third information may be controlled by the physical layer or the MAC layer.

FIG. 28 is a flowchart illustrating monitoring of the third information according to the embodiment. The mobile station device 1 performs processes of steps S2800 to S2804 on each subframe.

The mobile station device 1 allows the process to proceed to step S2802 when at least one of the following conditions (A1) to (A4) is satisfied in step S2800. The mobile station device 1 may not monitor the third information in the subframe when none of the conditions (A1) to (A4) is satisfied in step S2800.

condition (A1): The subframe is included in a period of the active time.
condition (A2): The HARQ RTT timer is running in the subframe.
condition (A3): There is a possibility of the transmission of the PUSCH and/or the aperiodic SRS being scheduled.
condition (A4): The transmission of the PUSCH and/or the aperiodic SRS is pending.

The mobile station device 1 allows the process to proceed to step S2804 when at least one of the following conditions (B1) to (B4) is satisfied in step S2804. The mobile station device 1 monitors the third information in step S2804. The mobile station device 1 may not monitor the third information in the subframe when at least one of the conditions (B1) to (B4) is not satisfied in step S2802.

condition (B1): The subframe is the PDCCH subframe.
condition (B2): The subframe is not necessary for the uplink transmission to the mobile station device 1 of the half duplex FDD operation.
condition (B3): The subframe is not the first flexible subframe necessary to transmit the uplink signal (the PUSCH or the PUCCH) to the mobile station device 1 of the dynamic TDD operation.
condition (B4): The subframe is not present in part of the set measurement gap.

The conditions used in step S2800 are not limited to the conditions (A1) to (A4). The conditions used in step S2802 are not limited to the conditions (B1) to (B4).

In step S2800, conditions other than the conditions (A1) to (A4) may be used and some of the conditions (A1) to (A4) may be used. In step S2802, conditions other than the conditions (B1) to (B4) may be used and some of the conditions (B1) to (B4) may be used.

For example, a condition (A5) may be used instead of the condition (A4) in step S2800.

condition (A5): The transmission of the PUSCH and/or the aperiodic SRS in the first flexible subframe is pending.

The mobile station device 1 may set a subframe set for monitoring the third information based on an instruction from the base station device 3. For example, the mobile station device 1 may monitor the third information in subframe 0 or 5 of the radio frame.

The subframe set for monitoring the third information may be specified or restricted based on the first uplink reference UL-DL configuration or the first downlink reference UL-DL configuration.

For example, when the first uplink reference UL-DL configuration is 0 and the first downlink reference UL-DL configuration is 2, the mobile station device 1 may monitor the third information in subframes 0 and 5 of the radio frame.

For example, when the first uplink reference UL-DL configuration is 0 and the first downlink reference UL-DL configuration is 3, the mobile station device 1 may monitor the third information in subframe 0 of the radio frame.

FIG. 29 is a diagram illustrating an example of the DRX operation according to the embodiment.

In FIG. 29, one primary cell is set in the mobile station device 1, the first uplink reference UL-DL configuration in regard to the primary cell is 0, and the first downlink reference UL-DL configuration in regard to the primary cell is 2.

In FIG. 29, onDurationTimer is 6, drx-InactivityTimer is 1, drx-RetransmissionTimer is 3, longDRX-Cycle is 40, and the value of drxStartOffset is 0. In FIG. 29, drxShortCycleTimer and shortDRX-Cycle are not set.

In FIG. 29, the value of the HARQ RTT timer is specified based on first downlink reference UL-DL configuration 2 and the table of FIG. 21.

In FIG. 29, a UL Tx timer (uplink transmission timer) indicates an amount from the subframe with which an uplink grant HARQ-ACK is received to the subframe with which the PUSCH and the aperiodic SRS are transmitted. That is, while the UL Tx timer is running, the transmission of the PUSCH and/or the aperiodic SRS is pending.

The UL Tx timer may be defined in each HARQ process and each aperiodic SRS. That is, the mobile station device 1 or the DRX control unit 1017 may include the plurality of UL Tx timers.

In FIG. 29, D denotes a downlink subframe, U denotes an uplink subframe, S denotes a special subframe, and P denotes a PDCCH subframe.

In FIG. 29, the subframe instructed as the downlink subframe or the subframe including the DwPTS in accordance with the first downlink reference UL-DL configuration is the PDCCH subframe.

In FIG. 29, the number of uplink HARQ processes is 7 and an uplink HARQ process number corresponds to the subframe instructed as the uplink subframe in accordance with the first uplink reference UL-DL configuration.

In FIG. 29, G denotes a subframe to which the PDCCH/EPDCCH used to transmit the uplink grant giving an instruction to transmit the PUSCH corresponding to uplink HARQ process 6 is mapped. The uplink grant corresponding to uplink HARQ process 6 in [SFN=0, subframe 6] gives an instruction to initially transmit the transport block via the PUSCH. The uplink grant corresponding to uplink HARQ process 6 in [SFN=1, subframe 6] gives an instruction to retransmit the transport block via the PUSCH.

In FIG. 29, the maximum number of transmissions of the transport block is 2. The mobile station device 1 may clear the transport block stored in the HARQ buffer after the transmission unit 107 is instructed to retransmit the transport block based on the uplink grant received in [SFN=1, subframe 6].

The maximum number of transmissions of the transport block may be controlled by the base station device 3. The base station device 3 may transmit information indicating the maximum number of transmissions of the transport block to the mobile station device 1. The mobile station device 1 may set the maximum number of transmissions of the transport block based on the information.

In FIG. 29, N denotes a subframe in which the PUSCH or the PDSCH of initial transmission is disposed and R denotes a subframe in which the PUSCH or the PDSCH of retransmission is disposed.

In FIG. 29, subframe n in which the uplink grant is disposed and subframe n+k in which the corresponding PUSCH is disposed are specified based on first uplink reference UL-DL configuration 0.

In FIG. 29, the mobile station device 1 succeeds in decoding of the PDSCH corresponding to downlink HARQ process 2 in [SFN=0, subframe 4], the PDSCH corresponding to downlink HARQ process 3 in [SFN=0, subframe 5], the PDSCH corresponding to downlink HARQ process 4 in [SFN=0, subframe 6], the PDSCH corresponding to downlink HARQ process 0 in [SFN=1, subframe 1], and the PDSCH corresponding to downlink HARQ process 1 in [SFN=2, subframe 4].

In FIG. 29, the mobile station device 1 fails in decoding of the PDSCH corresponding to downlink HARQ process 0 in [SFN=0, subframe 0], the PDSCH corresponding to downlink HARQ process 1 in [SFN=0, subframe 1], and the PDSCH corresponding to downlink HARQ process 1 in [SFN=1, subframe 3].

In FIG. 29, A denotes a subframe included in an active time. In FIG. 29, the subframe satisfying the condition (i) "onDurationTimer, drx-InactivityTimer, drx-RetransmissionTimer, or mac-ContentionResolutionTimer is running" and the condition (k) "An uplink grant for the pending HARQ retransmission is likely to be transmitted and data is present in a corresponding HARQ buffer" is included in the active time. In FIG. 29, mac-ContentionResolutionTimer is not running In FIG. 29, the subframe with which there is a possibility of the uplink grant being transmitted in response to pending HARQ retransmission is specified based on the first uplink reference UL-DL configuration and is [SFN=1, subframe 6].

In FIG. 29, the subframes satisfying the condition (A1) are the following subframes.
subframes 0 to 8 in SFN=0
subframes 1, 2, 3, and 6 in SFN=1.

In FIG. 29, the subframes satisfying the condition (A2) are the following subframes.
subframes 0 to 9 in SFN=0
subframes 0 and 1 in SFN=1

In FIG. 29, the subframes satisfying the condition (A3) include at least the following subframes.
subframes 3 to 6 in SFN=1

In FIG. 29, the subframes satisfying the condition (A4) include at least the following subframes.
subframes 6 to 9 in SFN=0
subframes 0, 1, 6, 7, 8, and 9 in SFN=1
subframes 0, 1, and 2 in SFN=2

In FIG. 29, the subframes from subframe 0 in SFN=0 to subframe 2 in SFN=2 satisfy at least one of the conditions (A1) to (S4). In FIG. 29, the subframes from subframe 3 in SFN=2 to subframe 0 in SFN=3 satisfy none of the conditions (A1) to (A4).

In FIG. 29, the mobile station device 1 is set so that the mobile station device 1 monitors the third information with subframe 0.

In FIG. 29, the mobile station device 1 monitors the third information in subframe 0 of SFN=0, subframe 0 of SFN=1, and subframe 0 of SFN=2 when subframe 0 of SFN=0, subframe 0 of SFN=1, and subframe 0 of SFN=2 satisfy all of the conditions (B1) to (B4).

In FIG. 29, the mobile station device 1 may not monitor the third information in subframe 0 of SFN=3.

The mobile station device 1 is set so that the mobile station device 1 monitors the third information with subframe 0. However, when onDurationTimer starts in the subframe other than subframe 0, there is a problem that the mobile station device 1 does not know the transmission direction UL-DL configuration until the third information is received in subframe 0 of a subsequent radio frame.

Accordingly, the subframe set in which the mobile station device 1 monitors the third information is set. When onDurationTimer starts in the subframe which does not belong to the subframe set, the third information may be monitored in the subframe closest to the subframe in which onDurationTimer starts among the subframes in which the third information is monitored.

The subframe set in which mobile station device 1 monitors the third information is set. When onDurationTimer starts in subframe which does not belong to the subframe set, the third information may be monitored in subframe n−k to subframe n−1 among the subframes in which the third information is monitored. For example, k1 is 9.

The subframe set in which mobile station device 1 monitors the third information is set. When onDurationTimer starts in subframe which does not belong to the subframe set, the third information may be monitored in the subframe of the radio frame in which onDurationTimer starts.

The mobile station device 1 may not monitor the third information while onDurationTimer related to the long DRX cycle is running. Further, the mobile station device 1 may monitor the third information while drx-InactivityTimer is running That is, the mobile station device 1 may not monitor the third information while onDurationTimer related to the long DRX cycle is running and drx-InactivityTimer is not running When drxShortCycleTimer and shortDRX-Cycle are set, the mobile station device 1 may not monitor the third information while onDurationTimer related to the long DRX cycle is running and drx-InactivityTimer is not running. Further, when drxShortCycleTimer and shortDRX-Cycle are not set, the mobile station device 1 may monitor the third information while onDurationTimer related to the long DRX cycle is running and drx-InactivityTimer is not running The base station device 3 may transmit, to the mobile station device 1, information giving an instruction of whether the mobile station device 1 monitors the third information while onDurationTimer related to the long DRX cycle is running and drx-InactivityTimer is not running Based on the information, the mobile station device 1 decides whether to monitor the third information while onDurationTimer related to the long DRX cycle is running and drx-InactivityTimer is not running Thus, the mobile station device 1 according to the embodiment includes the reception unit 105 that monitors a downlink control information format via a physical downlink control channel and the DRX control unit 1017 that controls monitoring of the physical downlink control channel used to transmit the downlink control information format to which the CRC parity bit scrambled with the C-RNTI is added based on the active time related to a discontinuous reception operation and controls monitoring of the physical downlink control channel used to transmit the downlink control information format including information for giving an instruction of a transmission direction of the subframe based on whether the HARQ RTT timer related to downlink HARQ retransmission is running and based on the active time.

The DRX control unit 1017 of the mobile station device 1 according to the embodiment further control monitoring of the physical downlink control channel used to transmit the downlink control information including the information based on whether there is a possibility of transmission of a physical uplink shared channel and/or an aperiodic SRS being scheduled and based on whether the transmission of the physical uplink shared channel and/or the aperiodic SRS being pending.

That is, the mobile station device 1 according to the embodiment includes the reception unit 105 that monitors a downlink control information format via a physical downlink control channel and the DRX control unit 1017 that controls monitoring of the physical downlink control channel used to transmit the downlink control information format to which the CRC parity bit scrambled with the C-RNTI is added during an active time related to a discontinuous reception operation and controls monitoring of the physical downlink control channel used to transmit the downlink control information format including information for giving an instruction of a transmission direction of the subframe at least while the HARQ RTT timer related to downlink HARQ retransmission is running The DRX control unit 1017 of the above-described mobile station device 1 further performs control such that the physical downlink control channel used to transmit the downlink control information format to which the CRC parity bit scrambled with the C-RNTI is added and the physical downlink control channel used to transmit the downlink control information format including the information are not monitored when at least one of a plurality of conditions is satisfied. The plurality of conditions include at least a condition that the subframe is part of a set measurement gap.

In the radio communication system to which the dynamic TDD is applied, the mobile station device 1 can reduce power consumption since it is not necessary to normally monitor the third information.

A program operated in the base station device 3 and the mobile station device 1 according to the invention may be a program (a program causing a computer to function) controlling a central processing unit (CPU) so that the functions of the foregoing embodiment related to the invention are realized. Information handled in these devices is temporarily accumulated in a random access memory (RAM) at the time of processing the information, the information is subsequently stored in any of various read-only memories (ROMs) such as flash ROMs or a hard disk drive (HDD), is read by the CPU, as necessary, and is corrected and written.

Parts of the mobile station device 1 and the base station device 3 according to the above-described embodiment may be realized by a computer. In this case, the parts may be realized by recording a program realizing the control function in a computer-readable recording medium, reading the program recorded in the recording medium to a computer system, and executing the program.

The "computer system" mentioned herein is a computer system internally included in the mobile station device 1 or the base station device 3 and is assumed to include an OS or hardware such as a peripheral device. The "computer-readable recording medium" refers to a portable medium such as a flexible disk, a magneto-optical disc, a ROM, or a CD-ROM or refers to a storage device such as a hard disk internally included in a computer system.

The "computer-readable recording medium" may include a medium that retains a program dynamically in a short time, when a program is transmitted via a network such as the Internet or a communication line such as a telephone line and a medium that retains a program for a given time, such as a volatile memory inside a computer system serving as a server or a client in this case. The program may be a program that realizes some of the above-described functions or may be a program that can realize the above-described functions in a combination with a program already recorded in a computer system.

The base station device 3 according to the above-described embodiment can be realized as a collective (device group) formed by a plurality of devices. Each of the devices forming the device group may include some or all of the functions or the function blocks of the base station device 3 according to the above-described embodiment. Each device may have each of the general functions or each of the function blocks of the base station device 3 as the device group. The mobile station device 1 according to the above-described embodiment can also communicate with base station devices serving as a collective.

The base station device 3 according to the above-described embodiment may be an Evolved Universal Terrestrial Radio Access Network (EUTRAN). The base station device 3 according to the above-described embodiment may have some or all of the functions of a higher node of an eNodeB.

Parts or all of the terminal device 1 and the base station device 3 according to the above-described embodiment may be realized as an LSI which is typically an integrated circuit or may be realized as a chip set. The function blocks of the terminal device 1 and the base station device 3 may be individually realized as chips, or some or all of the function blocks may be integrated to be realized as chips. A method of realizing an integrated circuit is not limited to an LSI, but may be realized as a dedicated circuit or a general-purpose processor. When a technology for realizing an integrated circuit substituted with an LSI with an advance in a semiconductor technology appears, an integrated circuit realized by the technology can also be used.

In the above-described embodiment, the terminal device or the communication device has been described as an example, but the present invention is not limited thereto. The present invention can also be applied to stationary or non-portable electronic devices installed indoors or outdoors, for example, terminal devices or communication devices such as AV devices, kitchen devices, cleaning and washing devices, air conditioners, office devices, automatic vending machines, or other life appliances.

The embodiments of the present invention have been described above in detail with reference to the drawings, but specific configurations are not limited to the embodiments and include design configurations or the like within the scope of the present invention without departing from the gist of the present invention. The present invention can be modified in various ways within the scope described in the claims and embodiments obtained by appropriately combining the technical means disclosed in other embodiments are also included in the technical range of the invention. Configurations in which elements described in the embodiments and having the same advantages are substituted with each other are also included.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SUBFRAME CONFIGURATION UNIT
1015 SCHEDULING INFORMATION ANALYSIS UNIT
1017 DRX CONTROL UNIT
3011 RADIO RESOURCE CONTROL UNIT
3013 SUBFRAME CONFIGURATION UNIT
3015 SCHEDULING UNIT
3017 DRX CONTROL UNIT

The invention claimed is:

1. A terminal device for which one serving cell is configured, the terminal device performing a discontinuous reception functionality, the terminal device comprising:

a reception circuit configured to and/or programmed to
receive first information and second information, the first information indicating an uplink/downlink configuration, the second information indicating an uplink/downlink configuration, and
receive information for setting first subframes for monitoring a physical downlink control channel with third information, the third information indicating an uplink/downlink configuration,
a transmission circuit configured to and/or programmed to
perform a transmission process of a physical uplink shared channel which corresponds to the physical downlink control channel based on an uplink-reference uplink/downlink configuration, and
perform a transmission process of HARD (Hybrid Automatic Repeat reQuest)-ACK (ACKnowledgement) which corresponds to a physical downlink shared channel based on a downlink-reference uplink/downlink configuration, wherein
the reception circuit is configured to and/or programmed to monitor, during an active time, the physical downlink control channel with the third information at at least a subframe which is a physical downlink control channel subframe in the first subframes,
the reception circuit is configured to and/or programmed to monitor the physical downlink control channel,
the monitoring being performed at a second subframe during the active time,
the monitoring being performed
based on whether or not the second subframe is a subframe instructed as a downlink subframe which is based on the uplink/downlink configuration indicated by the third information, and
based on whether or not the second subframe is part of a configured measurement gap,
the physical downlink control channel subframe is a subframe indicated, by the uplink/downlink configuration indicated by the first information, as a downlink subframe or a subframe which includes a DwPTS (Downlink Pilot Time Slot),
the active time includes a time while a timer which indicates a number of the physical downlink control channel subframe which is consecutive at a beginning of a discontinuous reception cycle is running,
the uplink/downlink configuration indicated by the first information is the uplink-reference uplink/downlink configuration,
the uplink/downlink configuration indicated by the second information is the downlink-reference uplink/downlink configuration, and
the uplink/downlink configuration indicated by the third information is used for monitoring the physical downlink control channel.

2. The terminal device according to claim 1, wherein
the active time includes a time while a drx-RetransmissionTimer is running,
the drx-RetransmissionTimer for a HARQ process is configured to and/or programmed to start in a case that a HARQ RTT timer expires, and data of the HARQ process to which the HARQ RTT (Round Trip Time) timer corresponds was not successfully decoded, and
a value of the HARQ RTT timer is based on the uplink/downlink configuration indicated by the second information.

3. A communication method performed by a terminal device for which one serving cell is configured, the terminal device performing a discontinuous reception functionality, the communication method comprising:
receiving first information and second information, the first information indicating an uplink/downlink configuration, the second information indicating an uplink/downlink configuration;
receiving information for setting first subframes for monitoring a physical downlink control channel with third information, the third information indicating an uplink/downlink configuration;
performing a transmission process of a physical uplink shared channel which corresponds to the physical downlink control channel based on an uplink-reference uplink/downlink configuration;
performing a transmission process of HARQ (Hybrid Automatic Repeat reQuest)-ACK (ACknowledgement) which corresponds to a physical downlink shared channel is performed based on a downlink-reference uplink/downlink configuration;
monitoring, during an active time, the physical downlink control channel with the third information at at least a subframe which is a physical downlink control channel subframe in the first subframes; and
monitoring the physical downlink control channel,
the monitoring being performed at a second subframe during the active time
the monitoring being performed
based on whether or not the second subframe is a subframe instructed as
a downlink subframe which is based on the uplink/downlink configuration indicated by the third information, and
based on whether or not the second subframe is part of a configured measurement gap, wherein
the physical downlink control channel subframe is a subframe indicated, by the uplink/downlink configuration indicated by the first information, as a downlink subframe or a subframe which includes a DwPTS (Downlink Pilot Time Slot),
the active time includes a time while a timer which indicates a number of the physical downlink control channel subframe which is consecutive at a beginning of a discontinuous reception cycle is running,
the uplink/downlink configuration indicated by the first information is the uplink-reference uplink/downlink configuration,
the uplink/downlink configuration indicated by the second information is the downlink-reference uplink/downlink configuration, and
the uplink/downlink configuration indicated by the third information is used for monitoring the physical downlink control channel.

4. The communication method according to claim 3, wherein
the active time includes a time while a drx-RetransmissionTimer is running,
the drx-RetransmissionTimer for a HARQ process starts in a case that a HARQ RTT (Round Trip Time) timer expires, and data of the HARQ process to which the HARQ RTT timer corresponds was not successfully decoded, and
a value of the HARQ RTT timer is based on the uplink/downlink configuration indicated by the second information.

5. An integrated circuit included in a terminal device for which one serving cell is configured, the terminal device performing a discontinuous reception functionality, the integrated circuit comprising:
a reception circuit configured to and/or programmed to
receive first information and second information, the first information indicating an uplink/downlink configuration, the second information indicating an uplink/downlink configuration, and
receive information for setting first subframes for monitoring a physical downlink control channel with third information, the third information indicating an uplink/downlink configuration; and
a transmission circuit configured to and/or programmed to
perform a transmission process of a physical uplink shared channel which corresponds to the physical downlink control channel based on an uplink-reference uplink/downlink configuration, and
perform a transmission process of HARQ (Hybrid Automatic Repeat reQuest)-ACK (ACknowledgement) which corresponds to a physical downlink shared channel based on a downlink-reference uplink/downlink configuration, wherein
the reception circuit is configured to and/or programmed to monitor, during an active time, the physical downlink control channel with the third information at at least a subframe which is a physical downlink control channel subframe in the first subframes,
the reception circuit is configured to and/or programmed to monitor the physical downlink control channel,
the monitoring being performed at a second subframe during the active time,
the monitoring being performed
based on whether or not the second subframe is a subframe instructed as a downlink subframe which is based on the uplink/downlink configuration indicated by the third information, and
based on whether or not the second subframe is part of a configured measurement gap,
the physical downlink control channel subframe is a subframe indicated, by the uplink/downlink configuration indicated by the first information, as a downlink subframe or a subframe which includes a DwPTS (Downlink Pilot Time Slot),
the active time includes a time while a timer which indicates a number of the physical downlink control channel subframe which is consecutive at a beginning of a discontinuous reception cycle is running,
the uplink/downlink configuration indicated by the first information is the uplink-reference uplink/downlink configuration,
the unlink/downlink configuration indicated by the second information is the downlink-reference uplink/downlink configuration, and
the uplink/downlink configuration indicated by the third information is used for monitoring the physical downlink control channel.

6. The integrated circuit according to claim 5, wherein
the active time includes a time while a drx-RetransmissionTimer is running,
the drx-RetransmissionTimer for a HARQ process is configured to and/or programmed to start in a case that a HARQ RTT (Round Trip Time) timer expires, and data of the HARQ process to which the HARQ RTT timer corresponds was not successfully decoded, and a value of the HARQ RTT timer is based on the uplink/downlink configuration indicated by the second information.

\* \* \* \* \*